US012520853B2

(12) United States Patent
Andersen et al.

(10) Patent No.: US 12,520,853 B2
(45) Date of Patent: Jan. 13, 2026

(54) APPARATUS AND METHOD FOR THE AUTOMATIC HARVESTING OF EDIBLE COMPONENTS OF A GIBLET BUNDLE OF SLAUGHTERED POULTRY

(71) Applicant: BAADER Food Systems Denmark A/S, Trige (DK)

(72) Inventors: Torben Andersen, Trige (DK); Bendt Soerensen, Trige (DK)

(73) Assignee: Baader Food Systems Denmark A/S, Trige (DK)

( * ) Notice: Subject to any disclaimer, the term of this patent is extended or adjusted under 35 U.S.C. 154(b) by 0 days.

(21) Appl. No.: 18/863,743

(22) PCT Filed: May 13, 2022

(86) PCT No.: PCT/EP2022/063045
§ 371 (c)(1),
(2) Date: Nov. 7, 2024

(87) PCT Pub. No.: WO2023/217386
PCT Pub. Date: Nov. 16, 2023

(65) Prior Publication Data
US 2025/0302057 A1     Oct. 2, 2025

(51) Int. Cl.
*A22C 21/00*     (2006.01)
*A22C 21/06*     (2006.01)

(52) U.S. Cl.
CPC .......... *A22C 21/06* (2013.01); *A22C 21/0053* (2013.01)

(58) Field of Classification Search
CPC ............................ A22C 21/06; A22C 21/0053
(Continued)

(56) References Cited

U.S. PATENT DOCUMENTS 5,152,715 A * 10/1992 van de Eerden ...... A22C 17/14
452/120
5,186,678 A * 2/1993 Conner .................. A22C 21/06
452/106
(Continued)

FOREIGN PATENT DOCUMENTS

CN         105377042 A      3/2016
CN         105764345 A      7/2016
(Continued)

OTHER PUBLICATIONS

International Search Report & Written Opinion dated Dec. 14, 2022 pertaining to PCT International application No. PCT/EP2022/063045 filed May 13, 2022, pp. 1-13.
(Continued)

*Primary Examiner* — Richard T Price, Jr.
(74) *Attorney, Agent, or Firm* — Dinsmore & Shohl LLP

(57) ABSTRACT

An apparatus and methods are for automatic harvesting of edible components of a giblet bundle. The apparatus includes a transport means for transporting the giblet bundle suspended on the heart and/or on the lungs, and which is positioned along a first transport path along a plurality of processing stations configured for removing the gall bladder and the intestines. The apparatus further includes a means for holding the giblet bundle arranged on a transport means for transporting parts of the giblet bundle, along a second transport path. The apparatus further includes a means for removing the heart and the lungs and a means for stripping the liver. The means for holding the giblet bundle is configured and adapted for pivoting a partial giblet bundle, about approximately 180°, such that it can be transported on the transport means for transporting parts of the giblet bundle.

44 Claims, 13 Drawing Sheets

(58) Field of Classification Search
USPC .......................................................... 452/112
See application file for complete search history.

(56) References Cited

U.S. PATENT DOCUMENTS

| | | | |
|---|---|---|---|
| 6,152,816 A * | 11/2000 | van den Nieuwelaar | .................. A22C 21/06 198/465.1 |
| 10,813,364 B2 * | 10/2020 | Zomerdijk | ......... A22C 21/0053 |
| 11,129,392 B2 * | 9/2021 | Teurlinx | ................. A22C 17/16 |

FOREIGN PATENT DOCUMENTS

| | | |
|---|---|---|
| EP | 0679336 A1 | 11/1995 |
| KR | 20140104593 A | 8/2014 |
| KR | 101465315 B1 | 12/2014 |

OTHER PUBLICATIONS

CN First Office Action dated Oct. 24, 2025 pertaining to CN patent application No. 202280092927.5 filed May 13, 2022, pp. 1-13 (Including English Translation) (13 pages).

* cited by examiner

APPARATUS AND METHOD FOR THE AUTOMATIC HARVESTING OF EDIBLE COMPONENTS OF A GIBLET BUNDLE OF SLAUGHTERED POULTRY

CROSS-REFERENCE TO RELATED APPLICATION

The present application is the National Phase entry of International Patent Application No. PCT/EP2022/063045, filed May 13, 2022, the entire contents are hereby incorporated by reference into this application.

FIELD OF THE INVENTION

The invention relates to an apparatus which is configured and adapted for the automatic harvesting of edible components, in particular a liver, a heart, lungs, and a gizzard, from a giblet bundle removed from slaughtered poultry which, in addition to the edible components, includes further giblet components, in particular a gall bladder, a spleen, a proventriculus, intestines, and a trachea and oesophagus.

The invention furthermore relates to a method for the automatic harvesting of edible components, in particular a liver, a heart, lungs, and a gizzard, from a giblet bundle removed from slaughtered poultry which, in addition to the edible components, includes further giblet components, in particular a gall bladder, a spleen, a proventriculus, intestines, and a trachea and oesophagus.

BACKGROUND OF THE INVENTION

Such apparatuses and methods are used in the poultry processing industry, in order to also harvest the edible components of the giblet bundle from the slaughtered poultry. For the automatic harvesting, the giblet bundle is already removed from the slaughtered poultry, for example a slaughtered chicken, and provided. In principle, all components can be referred to as edible components of the giblet bundle. However, in this case the liver, the heart, the lungs and the gizzard are considered the preferred edible components. In some regions of the world, inter alia the spleen and the proventriculus are also considered edible components. In other words, the definition of edible and non-edible components depends on the region in question. Ultimately, it is a question of obtaining all the components from the giblet bundle. In any case, for a maximum yield and the best possible harvest when obtaining consumable components of the slaughtered poultry, it is necessary to harvest the edible components completely, and as far as possible without damage. In this case, a particular focus is on the harvesting of the liver, as a particularly high-value and very vulnerable organ.

In previous apparatuses and methods for harvesting/obtaining the edible components of the giblet bundle, the giblet bundle removed completely from the slaughtered poultry is clamped or suspended around the heart, in the region of the heart and/or lungs. The giblet bundle, thus clamped and suspended, is transported along a plurality of processing stations. During this process, all the components of the giblet bundle are suspended on a means for clamping the giblet bundle or parts thereof, in a manner directed substantially vertically downwards. During the entire harvesting process of all the components of the giblet bundle, the giblet bundle remains suspended in the region of the heart and/or the lungs. This results in inter alia the liver, which is considered particularly valuable, being pulled from the giblet bundle, still suspended on the heart and/or the lungs, the liver still being connected to the heart and/or the lungs by tissue.

In other words, the processing station for harvesting the liver is arranged upstream of the processing station for harvesting the heart and/or lungs, in the transport direction of the giblet bundle. As a result, the liver is quasi torn or pulled from the giblet bundle suspended on the heart and/or the lungs. Due to the tearing or pulling of the liver from the giblet bundle, and in particular from the heart, to which there is a firm tissue connection, the liver is often harvested only incompletely and in particular damaged. In particular parts of the liver are also torn out in this process. Accordingly, the position and orientation of the individual organs or components of the giblet bundle on the one hand, and the sequence of the harvesting of the individual organs or components from the giblet bundle on the other hand, lead to problems in the complete and gentle harvesting of all organs and components, and in particular the liver.

SUMMARY OF THE INVENTION

It is therefore an object of the present invention to provide a simple and reliable apparatus for harvesting the organs or components, and in particular the liver, from the giblet bundle, completely and without damage. A further object of the invention is to propose a corresponding method.

This object is achieved by an apparatus having the features mentioned at the outset, in that the apparatus comprises transport means for transporting the giblet bundle, held on the heart and/or on the lungs, or parts thereof, along a first transport path along a plurality of processing stations, and a plurality of processing stations, namely means for removing the gall bladder and the intestines from the giblet bundle suspended on the heart and/or on the lungs, means for holding the giblet bundle, still suspended on the heart and/or on the lungs and freed of the gall bladder and intestines, in the region of the gizzard, the means for holding the giblet bundle in the region of the gizzard being arranged on a transport means for transporting parts of the giblet bundle, comprising the liver, along a second transport path, means for removing the heart and the lungs from the giblet bundle, the means for holding the giblet bundle in the region of the gizzard being configured and adapted for pivoting the partial giblet bundle, freed from the gall bladder, intestines, heart and lungs, about approximately 180°, such that the partial giblet bundle, together with the liver, can be transported, hanging downwards, on the transport means for transporting parts of the giblet bundle comprising the liver, and means for stripping the liver, hanging downwards, from the partial giblet bundle. The selection and sequence, according to the invention, of the individual processing stations, on the one hand, and the design of the individual processing stations, on the other hand, ensure complete and damage-free harvesting of the organs or components, and in particular the liver, from the giblet bundle. Firstly, after the gall bladder and intestines have been removed, the giblet bundle encounters the processing station for removing the heart and lungs from the giblet bundle. However, before the heart and lungs are completely separated from the giblet bundle, the giblet bundle encounters the means for holding the giblet bundle in the region of the gizzard, such that the giblet bundle is briefly held at two positions. With the complete separating of the heart and lungs from the giblet bundle, the partial giblet bundle that is freed of the gall bladder, intestines, heart and lungs, is held only in the means for holding the partial giblet bundle in the region of the gizzard. As a result of the separating of the heart and lungs from the giblet bundle prior to the harvesting of the liver, the liver is free in the upper region facing the heart and the lungs, and is connected, in particular to the proventriculus, only slightly, via tissue. Since the means for holding the partial giblet bundle in the region of the gizzard is configured so as to be pivotable, namely about approximately 180°, such that the partial giblet bundle, following pivoting, is oriented upside down, having the gizzard at the top and the liver hanging downwards, the partial giblet bundle thus transported along the second transport path encounters the processing station for harvesting the liver, which, positioned and oriented in this way and already separated from the heart and lungs, can be stripped particularly easily. The stripping of the liver can then even take place manually, but preferably in an automated manner using the stripping means. The design of the apparatus according to the invention, such that the partial giblet bundle which is freed of the heart and lungs, and also of the gall bladder and intestines, is held in the region of the gizzard and rotated about 180°, facilitates and simplifies the harvesting in particular of the liver, since the liver, as the heaviest organ of the partial giblet bundle, hangs downwards during rotation, on account of gravity, such that the stripping process can be carried out gently and easily.

Preferably, the transport means for transporting the giblet bundle, held on the heart and/or on the lungs, or parts of said bundle, along the first transport path, comprises a transport conveyor as well as at least one transport trolley that is arranged on the transport conveyor and is movable along the first transport path, each transport trolley comprising means for clamping the giblet bundle, or parts thereof, on the heart and/or on the lungs, and for releasing it again. The transport conveyor comprises, for example, a transport chain on which at least one transport trolley, but preferably a plurality of transport trolleys, is arranged. Each transport trolley comprises sliding rollers or the like, which are guided on a transport rod or roll thereon, respectively. Furthermore, each transport trolley comprises means for clamping the giblet bundle, or parts thereof, on the heart and/or on the lungs. Optionally, the clamping means comprises for example two clamping jaws, which are configured and adapted to be movable relative to one another, towards one another for clamping, and away from one another for releasing. The transport means, by means of which initially the entire giblet bundle, and after the removal of the heart and lungs from the giblet bundle only components held by the means for clamping the giblet bundle, or parts thereof, on the heart and/or on the lungs, are held and transported along the first transport path, can of course also be configured and adapted in a different manner.

A preferred embodiment of the apparatus is characterised in that the transport conveyor is associated with guide means for capturing and positioning the heart, clamped in the transport trolley, and the lungs. Using said guide means, the heart and the lungs can be optimally positioned for the separating cut. The heart, held in the transport trolley, and the lungs, can be brought into a controlled and reproducible position, with respect to the means for removing the heart and the lungs from the giblet bundle, by means of the guide means.

A particularly advantageous further development of the apparatus is characterised in that the guide means comprises at least two guide rods, one guide rod being associated with a guide plate, by means of which spatial separating of the heart and lungs still connected to the giblet bundle, on the one hand, and the remaining components of the giblet bundle, on the other hand, can be achieved, and in addition the remaining components of the giblet bundle can be brought into an inclined position. When the giblet bundle is threaded in between the guide rods, the arrangement and design, as well as the positioning, thereof results in the heart and lungs lying between the guide rods, while the remaining components of the giblet bundle are guided outside of the two guide rods externally on the guide plate. Due to the inclination of the guide plate, the remaining components of the giblet bundle suspended on the transport trolley can be brought into a slightly raised, inclined position in order to bring the remaining components of the giblet bundle into an optimal position for gripping by the means for holding the partial giblet bundle in the region of the gizzard.

Advantageously, The guide rods are arranged so as to be oriented substantially in the transport direction T1, at least in portions, and so as to be spaced apart and offset in height relative to one another. Accordingly, an upper and a lower guide rod are provided, by means of which the heart and the lungs can be brought into an optimal orientation and spatial position for separation. In the event that the heart and lungs are located entirely or in part below the means for clamping the giblet bundle, the orientation and design of the guide rods result in the heart and lungs being pushed upwards, preferably to a level at the height of the means for clamping, by the guide rod arranged further below. In the event that the heart and lungs are located entirely or in part above the means for clamping the giblet bundle, the orientation and design of the guide rods result in the heart and lungs being pushed downwards, preferably to a level at the height of the means for clamping, by the guide rod arranged further above.

Expediently, the guide rods for orienting the trapped and positioned heart and/or the lungs are shaped with respect to the means for clamping the giblet bundle or parts thereof. As a result, reliable and precise guidance of the giblet bundle, and in particular of the heart and lungs, in an optimized and stable spatial orientation on the means for removing the heart and lungs, arranged at the end of the guide means in the transport direction T1, is ensured.

Particularly preferably, a cooling element is arranged in the region of the guide means, by means of which cooling element the giblet bundle suspended on the transport trolley can be cooled, at least in part, during transport along the first transport path. The cooling element is configured and adapted for receiving and cooling at least parts of the giblet bundle, e.g. as a type of dip tank, into which the giblet bundle can be dipped e.g. for 10 to 60 seconds. The cooling makes the components of the giblet bundle firmer/stiffer prior to the actual harvesting, which significantly simplifies and improves damage-free removal of individual components from the giblet bundle, in particular the liver. The cooling element can be configured, adapted and arranged to cool the entire giblet bundle. Optionally, the cooling element can be configured, adapted and arranged to cool only parts of the giblet bundle, preferably below the heart and lungs.

A preferred apparatus is characterised in that the means for removing the heart and the lungs from the giblet bundle is arranged in the region of the end of the guide means in transport direction, the means for removing the heart and the lungs from the giblet bundle comprising at least one circular knife. The circular knife can be driven by means of a drive, and is configured and adapted for sepating the (tissue) connection between the heart and lungs on the one hand, and the remaining components of the giblet bundle on the other hand. The means for removal can also be a simple blade or a knife instead of the circular knife. Instead of the circular knife, other separating mechanisms can also be used. After the separation of the heart and lungs from the giblet bundle, the heart and lungs are still suspended on the transport trolley and are transported further by the latter along the first transport path until the heart and lungs are released, while the partial giblet bundle freed of the gall bladder, intestines, heart and lungs is transported further along the second transport path by the transport means for transporting the giblet bundle comprising the liver.

Expediently, a separator for separating the heart, separated from the giblet bundle, from the lungs, is arranged under the circular knife or any other cutting or separating mechanism, in the region of release of the heart and lungs from the clamping means of the transport trolley. The unit consisting of the heart and lungs is released from the clamping and falls for example onto a roller pair, the spiral rollers of which are driven in a opposite directions, allowing the heart to be separated from the lungs and further processed separately. Other separating mechanisms for separating the heart and lungs can also be used.

A preferred development of the apparatus is characterised in that a stretching means is arranged in the region of the circular knife, such that the giblet bundle to be processed encounters the stretching means immediately before reaching the circular knife. The stretching means is for example a spreader clamp or the like, by means of which the tissue, which in particular connects the heart and also the lungs to the remaining components of the giblet bundle, and also the tracheatrachea and the oesophagus, can be preloaded, as a result of which the separating/cutting of the heart and lungs from the remaining giblet bundle is simplified and made more precise. In particular the heart can be harvested without damage.

An advantageous embodiment of the apparatus is characterised in that a transfer position is configured, in the region of the guide plate, between the transport means for transporting the giblet bundle held on the heart and/or on the lungs, or parts thereof, along the first transport path, and the transport means for transporting parts of the partial giblet bundle comprising the liver, along the second transport path, such that the transport trolley clamping the heart and the lungs is movable along the first transport path, independently of the means, holding the partial giblet bundle freed of the heart and lungs, and also of the gall bladder and intestines, for holding the partial giblet bundle in the region of the gizzard, along the second transport path. Briefly, the giblet bundle is held at at least two points in the transfer region, namely in the region of the heart and the lungs on the one hand, and in the region of the gizzard on the other hand. In addition to the possibility of controlled transfer of the partial giblet bundle onto the second transport means, the spatial positioning of the individual components of the giblet bundle, specifically of the heart and lungs on the one hand and of the partial giblet bundle on the other hand, can be reliably retained thereby.

A preferred development of the apparatus is characterised in that the means for removing the gall bladder and the intestines is arranged upstream, in the transport direction T1, from the means for holding the giblet bundle, still suspended on the heart and/or on the lungs, in the region of the gizzard, and comprises a stretching station and a separation station, the stretching station comprising stretching means for stretching the intestines, and the separation station comprising separation means for separating the intestines and the gall bladder from the other components of the giblet bundle. In this context, the separation describes the "untangling" or spatial separating of the gall bladder and intestines on the one hand, and the other components of the giblet bundle on the other hand. Thus, the intestines and gall bladder can be exposed, in order to subsequently perform a precise separating cut from the giblet bundle.

Advantageously, the stretching means is arranged in stationarily on a frame or the like, and comprises at least one pair of stretching rollers and at least one counterhold element which is arranged so as to be spaced apart from the pair of stretching rollers. The intestines can be gripped by said stretching means or other suitable stretching means, and can be pulled downwards by means of the pair of stretching rollers, while the counterhold element holds the remaining giblet bundle, suspended on the heart and/or the lungs, against the resistance of the pair of stretching rollers.

An expedient development of the apparatus is characterised in that the pair of stretching rollers comprises two stretching rollers which are driven in opposite directions, and the counterhold element comprises at least one, preferably at least two, holding and/or guide rods. The drawing rollers are configured, adapted and positioned for gripping and clamping the intestines in the direction of a cloaca located at the end of the intestines. The holding and/or guide rods are configured, adapted and positioned for guiding and/or holding the intestines in the transition of the intestines to the gizzard. As a result of the interaction between the drawing rollers and the holding and/or guide rods, the intestines are stretched, and the gall bladder is exposed.

An advantageous embodiment of the apparatus is characterised in that the separation means comprises at least one clamping device and at least one lifting element, and each lifting element is configured and adapted to be movable from a—lower-receiving position for receiving the stretched intestines, into an—upper-separating position, and back, such that the intestines and the gall bladder are located under each lifting element, in the separation position. The intestines and gall bladder, still suspended on the giblet bundle and connected thereto, hang freely below the lifting element, such that they are positioned in a manner exposed for separation.

Advantageously, the clamping device comprises clamping bodies for clamping the intestines, and the or each lifting element comprises a lifting body that can be moved back and forth and up and down. The clamping body can be configured in a bracket-like or clamping jaw-like manner, and can be single-piece or multi-piece. The clamping body is preferably configured to be stationary, while the or each lifting body is movable relative to the clamping body. The lifting body can also be configured in single-piece or in multi-piece, and is configured and adapted to enclose the intestines. Moving the lifting body upwards from the receiving position and into the separating position, the exposed gall bladder is separated from the remaining giblet bundle.

An advantageous development of the apparatus is characterised in that the separation means comprises a separating device for separating the gall bladder, located under each lifting element, and the intestines, from the giblet bundle, which still at least comprises the heart, lungs, liver, gizzard, spleen, proventriculus, and the trachea and oesophagus. The separating device can be a simple blade or knife. Circular knives or other separating mechanisms can also be used as the separating device.

A particularly preferred embodiment of the apparatus is characterised in that the means for holding the giblet bundle still suspended on the heart and/or on the lungs, or the partial giblet bundle, respectively, in the region of the gizzard, comprises at least one holding apparatus which comprises a support arm and a pivot arm which is hingedly arranged on the support arm, the support arm being arranged on the transport means for transporting parts of the partial giblet bundle, including the liver, along the second transport path, and the pivot arm is configured so as to be pivotable about a pivot axis S, from a receiving position, about approximately 180°, into a processing position, and back, following the removal of the heart and the lungs from the giblet bundle. The support arm and thus also the pivot arm can be rotatably driven. In the region of the transfer position of the partial giblet bundle, i.e. of the giblet bundle without the gall bladder, intestines, heart and lungs, the pivot arm is pivoted into a receiving position, in order to grip the partial giblet bundle, positioned by the guide plate, in the region of the gizzard. After the partial giblet bundle is gripped and freed of the heart and lungs, the transport means moves the partial giblet bundle along the second transport path to a downstream processing station. During the transport, the pivot arm can be pivoted about approximately 180°, into the processing position, such that the partial giblet bundle is upside down. Thus, the gizzard protrudes upwards, while the liver, which, on account of the separating of the heart and lungs at the upper face thereof is no longer connected to the remaining components, and furthermore is connected still only slightly to the remaining partial giblet bundle by tissue, hangs downwards. This allows the liver to be detached from the partial giblet bundle in a particularly simple and damage-free manner with low forces.

Advantageously, a clamping device is arranged on a free end of the pivot arm, which device is configured and adapted for clamping the gizzard. The clamping device comprises, for example, two clamping jaws or pincer-like clamping brackets which can be moved towards and away from one another. Other components for clamping the gizzard can also be used.

A particularly preferred development of the apparatus is characterised in that the transport means for transporting the partial giblet bundle comprising the liver along the second transport path comprises a rotary plate, the rotary plate being configured and adapted such that it can be synchronised, by means of a synchronisation element, with the transport conveyor of the transport means for transporting the partial giblet bundle held on the heart and/or on the lungs, or parts thereof, along the first transport path.

The synchronisation element can be a mechanical synchronisation disc. However, electronic synchronisation elements can also be used. The transport means can optionally also comprise two rotary plates, which are arranged so as to be spaced apart from one another, in order to form a carousel conveyor.

Advantageously, at least two holding apparatuses for holding the giblet bundle still suspended on the heart and/or on the lungs, or the partial giblet bundle freed of the heart and lungs, and also of the gall bladder and intestines, in the region of the gizzard, are arranged on the rotary plate or on the carousel conveyor. While a holding means still grips and holds a giblet bundle suspended on the transport trolley, in the transfer position, a holding means arranged downstream of the mentioned holding means, in the transport direction T1, can hold a partial giblet bundle and pivot it into the liver-harvesting position. Particularly preferably more than two, e.g. six or twelve, such holding means are provided, which are evenly distributed over the periphery.

In an alternative embodiment, the means for holding the giblet bundle or the partial giblet bundle comprises a vacuum holding device as an alternative or in addition to the support and pivot arm. The vacuum holding device is configured as a type of suction cap and, as such, is configured and adapted for being pulled over the free end of the gizzard. Said suction cap or any other vacuum component configured and adapted for holding the gizzard is configured so as to be pivotable, such that the suctioned and held partial giblet bundle is quasi suspended on the gizzard following the pivoting, which facilitates the harvesting of the organs or components of the partial giblet bundle.

Advantageously, each means for holding the giblet bundle still suspended on the heart and/or on the lungs, or the partial giblet bundle, in the region of the gizzard—or each holding apparatus—is in each case associated with a means for stripping the liver, hanging downwards, from the giblet bundle. Thus, a holding apparatus for holding the partial giblet bundle, which apparatus is formed of the support and pivot arm and/or vacuum holding device, and a means for stripping the liver, form a processing unit which is arranged so as to be movable in a rotating manner on the transport means, along the second transport path.

Expediently, the means for stripping the liver, hanging downwards, from the partial giblet bundle, is configured and adapted so as to be movable relative to the means for holding the giblet bundle still suspended on the heart and/or on the lungs, or the partial giblet bundle, in the region of the gizzard. The means for stripping is preferably movable up and down relative to the rotary plate, on which the holding apparatus is arranged and fastened. For this purpose, the means for stripping the liver, hanging downwards, from the partial giblet bundle, is preferably configured and adapted so as to be movable up and down along at one guide rod. Particularly preferably, the means for stripping the liver is arranged and guided on two guide rods. The or each guide rod connects the rotary plate, on which the holding apparatus is arranged, to a second rotary plate. The means for stripping can optionally also be arranged on a handling arm or the like, by means of which the means for stripping can be brought into operative connection with the partial giblet bundle, held by the means for holding the partial giblet bundle.

A preferred further development of the apparatus is characterised in that the means for stripping comprises two scraper elements which are movable relative to one another, and which are made at least partially from a flexible material on their inner sides facing one another. This design ensures secure gripping and holding of the liver which is gentle on the liver. The flexible design furthermore ensures that the liver is treated in a manner gentle on the product during the stripping.

Advantageously, a means for removing the proventriculus and/or the spleen from the partial giblet bundle freed from the liver is arranged along the second transport path of the transport means for transporting the partial giblet bundle. Said processing station for removing the proventriculus and/or the spleen comprises separating means, preferably circular knives, which are arranged along the second transport path. The separating means can be configured so as to be stationary. Preferably, however, the separating means are configured and adapted so as to be movable from a waiting position into a separating position, and back. The or each separating means is arranged at a position, in transport direction T2, at which the liver is already completely detached from the partial giblet bundle.

A preferred development of the apparatus is characterised in that a means for cutting open the gizzard is arranged along the second transport path of the transport means for transporting the partial giblet bundle, in the region of the means for removing the proventriculus and/or the spleen, or downstream thereof in the transport direction T2. The means for cutting open the gizzard can be configured so as to be stationary. Preferably, however, the means is configured and adapted so as to be movable from a waiting position into a separating position, and back. The means for separating is preferably a circular knife.

Advantageously, an output station for the—closed or cut-open—gizzard from the means for holding the partial giblet bundle is configured, along the second transport path of the transport means for transporting the partial giblet bundle in the transport direction T2, behind the means for removing the proventriculus and/or the spleen, a means for removing a yellow stomach skin of the gizzard being arranged in the region of the output station. The means for removing the stomach skin is preferably positioned such that the yellow stomach skin, still held, hangs directly over the means for removing the yellow stomach skin, or the released gizzard falls into the means for removing the yellow stomach skin.

An expedient embodiment of the apparatus is characterised in that the means for removing the yellow skin comprises a roller pair, two skinning rollers of the roller pair being configured and adapted so as to be driveable in opposite directions. By way of this option, the yellow abdominal skin can be reliably removed from the cut-open gizzard.

A development of the apparatus is particularly advantageous in which the apparatus is connected to a controller for controlling the transport means and all the processing stations for the automatic harvesting of individual organs and/or individual components of the giblet bundle or of the partial giblet bundle. By means of the controller information—obtained by means of detection devices, sensors, optical, electronic or other means—can be collected, processed and stored in order to control the transport means and all the components arranged along the first and the second transport path.

The object is also achieved by a method mentioned at the outset, which is characterised by the steps of: transporting the giblet bundle, held on the heart and/or on the lungs, along a first transport path, removing the gall bladder and the intestines from the giblet bundle, gripping and holding the giblet bundle, still suspended on the heart and/or the lungs and freed of the gall bladder and intestines, in the region of the gizzard, removing the heart and the lungs from the giblet bundle, transporting the partial giblet bundle, held on the gizzard and freed from gall bladder, intestines, heart and lungs, along a second transport path, and pivoting said partial giblet bundle about approximately 180°, and stripping the liver, hanging downwards, from the partial giblet bundle. The sequence of steps according to the invention, of first separating the tissue connection between the heart and lungs on the one hand, and the partial giblet bundle comprising the liver on the other hand, and only then removing the liver from the partial giblet bundle after the partial giblet bundle has been pivoted about approximately 180°, i.e. turned upside down, makes it possible for the liver to be stripped using very low forces and in a manner gentle on the product. During stripping of the liver, hanging downwards, which virtually detaches from the partial giblet bundle simply by means of its own weight, the liver can be harvested as a whole without damage.

Advantageously, before the removal of the gall bladder and the intestines, the intestines are stretched, and the stretched intestines and the gall bladder are spatially separated from the other components of the giblet bundle. As a result of the stretching process, the gall bladder is exposed, relative to the further components of the giblet bundle, and can be separated, together with the intestines, i.e. exposed with respect to the remaining components of the giblet bundle, in order to reliably and easily cut the gall bladder and intestines from the giblet bundle.

An expedient further development of the method provides for cooling of the giblet bundle prior to the removal of the gall bladder and the intestines, but preferably after the removal of the gall bladder and the intestines and prior to further processing. The giblet bundle can be cooled as a whole. Since the gall bladder and intestines are generally not harvested for consumption, the cooling can also take place after the separation of the gall bladder and intestines from the giblet bundle. For the purpose of cooling, the giblet bundle can be dipped entirely or in part into an iced water tank, or led through an iced water channel. The residence time can vary, and is preferably 10 to 60 seconds. The cooling can, however, also be performed in a different manner, e.g. by applying liquid nitrogen or the like to the giblet bundle or parts thereof. By means of the cooling, the organs or components of the giblet bundle obtain higher strength and/or stiffness, as a result of which the precise and damage-free harvesting is facilitated.

Advantageously, the giblet bundle freed from the gall bladder and the intestines is trapped and positioned in the region of the heart and of the lungs, such that the heart and lungs are arranged at the level of a means clamping the heart and the lungs, and are pressed in the direction of the outer ends of the means. In principle, the entire giblet bundle can also be initially trapped and positioned. However, the catching and positioning preferably takes place after the removal of the gall bladder and the intestines from the giblet bundle, in order to optimally orient the giblet bundle, freed from the gall bladder and intestines, for the following process step.

A preferred development of the method is characterised in that the heart still connected to the giblet bundle and the lungs still connected to the giblet bundle are spatially separated from the remaining components of the giblet bundle during transport along the first transport path. This means that a structural barrier between the lungs and heart on the one hand, and the remaining components of the giblet bundle on the other hand, is created, in order to separat the heart and lungs from the giblet bundle in a manner that is reliable and damage-free, and in the process protects the remaining components in a shielded manner.

Expediently, tissue connections to the remaining components of the giblet bundle are stretched before the removal of the heart and the lungs from the giblet bundle. Firm tissue connections exist in particular between the heart and liver. The stretching ensures that the means for removing the heart and lungs can be attached precisely to the tissue connections, in order to be able to separate the heart and the lungs from the giblet bundle, and in particular from the liver, without causing damage. By means of the separating of the tissue connections, the upper region of the liver, facing the heart and the lungs, becomes free, such that the liver is then only loosely connected to the giblet bundle.

Preferably, the remaining components of the giblet bundle are brought into an inclined position, in order to be gripped and held in the region of the gizzard. For this purpose, the remaining components are pushed slightly upwards, out of the position hanging vertically downwards, such that they can be easily gripped in the region of the gizzard. As an alternative or in addition, the gizzard, initially still directed downwards, can also be held by applying a vacuum, before the partial giblet bundle is then pivoted upside down, about approximately 180°, in order to remove the liver.

An advantageous development of the method is characterised in that, following stripping of the liver from the giblet bundle, the spleen and/or the proventriculus and/or the trachea and oesophagus are removed from the still gripped and held gizzard. Thus, gradually, all the preferably edible organs or components of the giblet bundle are harvested individually and separately, in succession, as a result of which an optimal processing result is achieved.

Preferably, the gizzard, which is still gripped and held, is cut open and then released. With this cut, the inside of the gizzard becomes accessible. Particularly preferably, a yellow stomach skin of the gizzard is then removed from the cut-open gizzard, by an outside edge of the cut-open and released gizzard falling directly into the region of skinning rollers. The removal of the yellow stomach skin preferably in one piece makes it possible for the gizzard to be further processed as an edible organ. Optionally, the gizzard can also still be gripped and held, for the purpose of releasing and removing the yellow stomach skin, such that the outer edge of the yellow stomach skin is guided into the skinning rollers in a targeted and controlled manner. The release of the gizzard then takes place only after the detachment, or even only after the complete removal, of the yellow stomach skin.

As already mentioned, the organs or components of the giblet bundle are obtained in succession and separately. Firstly, the unit consisting of the heart and lungs is separated from the giblet bundle, which is optionally already freed from the gall bladder and intestines. Subsequently, all further organs or components are separated, in particular the liver first, such that this can be harvested completely and without damage. Following release thereof, the heart removed from the giblet bundle and the lungs removed from the giblet bundle are supplied directly to a separator for separating the heart from the lungs. Thus, all the organs and components of the giblet bundle preferably suitable for eating are separated from the giblet bundle in a gentle manner and without damage, and harvested for further processing.

Advantageously all the steps for harvesting the individual organs or further components of the giblet bundle are automatically matched to one another in a manner controlled by means of a controller. Thus, reproducible and qualitatively high-value harvesting of the organs and the further components is ensured.

Particularly preferably, the method is carried out by an apparatus as disclosed in.

Further advantages resulting from the individual method steps have already been described in connection with the apparatus, and therefore, in order to avoid repetition, reference is made to the corresponding passages.

BRIEF DESCRIPTION OF THE DRAWINGS

Further expedient and/or advantageous features and developments regarding the apparatus and the corresponding method can be found in the dependent claims and the description. Particularly preferred embodiments are explained in greater detail with reference to the accompanying drawings, in which:

FIG. 1b is a front view of the representation according to FIG. 1a;

FIG. 2b is a front view of the representation according to FIG. 2a;

FIG. 3b is a front view of the representation according to FIG. 3a;

FIG. 4b is a front view of the representation according to FIG. 4a;

FIG. 5b is a front view of the representation according to FIG. 5a;

FIG. 6b is a front view of the representation according to FIG. 6a;

FIG. 7b is a front view of the representation according to FIG. 7a;

FIG. 8b is a front view of the representation according to FIG. 8a; and

DETAILED DESCRIPTION OF THE INVENTION

Figure 1A:
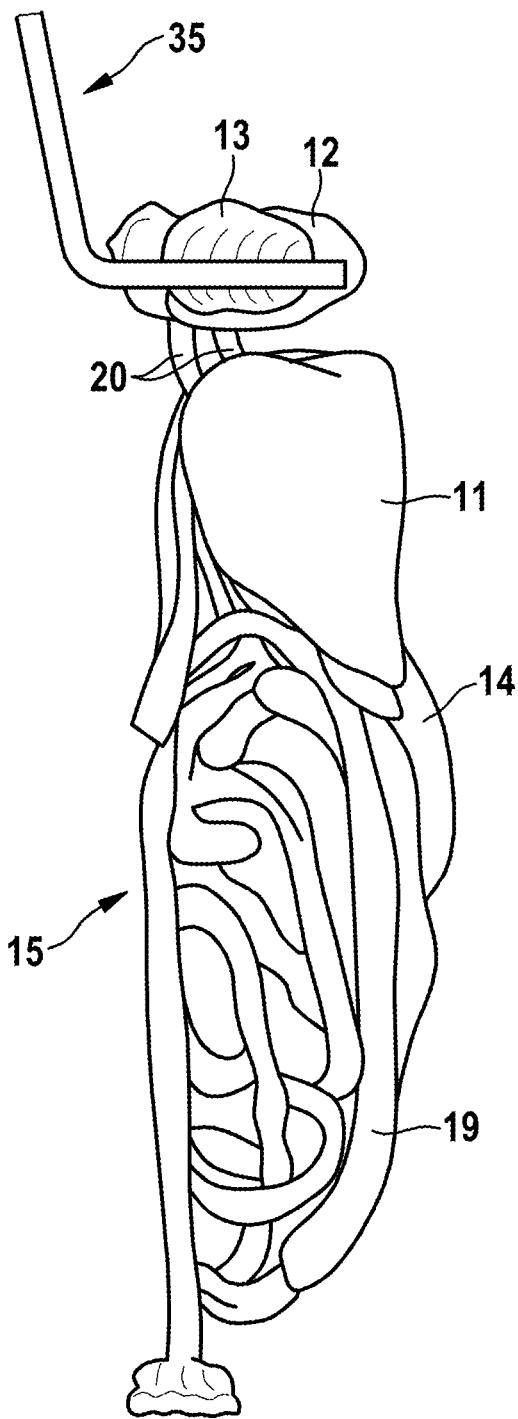
FIG. 1a is a schematic side view of a giblet bundle clamped and suspended in the region of the heart and/or lungs.
Figure 1B:
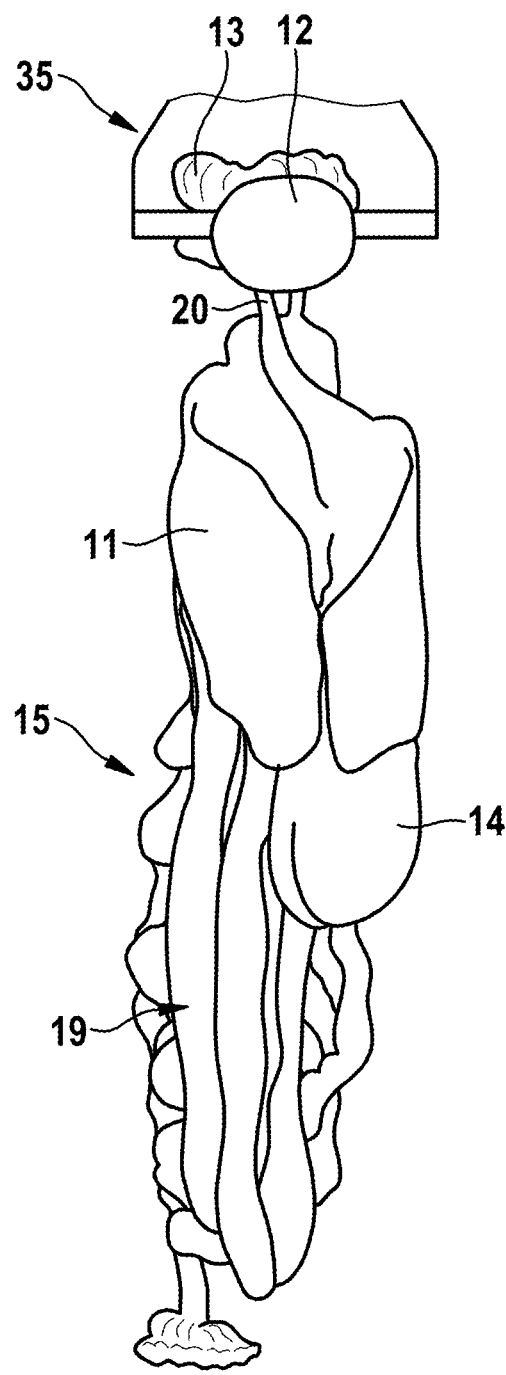

The apparatus shown and according to the invention, serves for automatic harvesting of the edible and non-edible organs and components of a giblet bundle removed from a slaughtered chicken. The apparatus is in particular also suitable and configured for harvesting individual organs, e.g. heart, lungs and liver, from giblet bundles of other poultry.

The apparatus 10 shown in the drawings is configured and adapted for the automatic harvesting of edible components, in particular a liver 11, a heart 12, a lung 13, and a gizzard 14, from a giblet bundle 15 removed from slaughtered poultry which, in addition to the edible components, includes further giblet components, in particular a gall bladder 16, a spleen 17, a proventriculus 18, intestines 19, and a trachea and oesophagus 20.

According to the invention, said apparatus 10 is characterised in that the apparatus 10 comprises transport means 21 for transporting the giblet bundle 15, held on the heart 12 and/or on the lungs 13, or parts thereof, along a first transport path along a plurality of processing stations, and a plurality of processing stations, namely means 22 for removing the gall bladder 16 and the intestines 19 from the giblet bundle 15 suspended on the heart 12 and/or on the lungs 13, means 23 for holding the giblet bundle 15, still suspended on the heart 12 and/or on the lungs 13 and freed of the gall bladder 16 and intestines 19, in the region of the gizzard 14, the means 23 for holding the giblet bundle 15 in the region of the gizzard 14 being arranged on a transport means 24 for transporting parts of the giblet bundle 15, comprising the liver 11, along a second transport path, means 25 for removing the heart 12 and the lungs 13 from the giblet bundle 15, the means 23 for holding the giblet bundle 15 in the region of the gizzard 14 being configured and adapted for pivoting the partial giblet bundle 15a, freed from the gall bladder 16, intestines 19, heart 12 and lungs 13, about approximately 180°, such that the partial giblet bundle 15a, together with the liver 11, can be transported, hanging downwards, on the transport means 24 for transporting parts of the partial giblet bundle 15a comprising the liver 11, and means 26 for stripping the liver 11, hanging downwards, from the partial giblet bundle 15a.

The features and developments described in the following constitute preferred embodiments, taken individually or in combination with one another. It is explicitly noted that features which are summarised in the claims and/or the description and/or the drawings, or are described in a common embodiment, can also functionally independently develop the apparatus 10 described above.

The transport means 21 for transporting the giblet bundle 15, held on the heart 12 and/or on the lungs 13, or parts of said bundle, along the first transport path, comprises a transport conveyor 30 as well as at least one transport trolley 31 that is arranged on the transport conveyor 30 and is movable along the first transport path. By way of example, a transport chain is shown as the transport conveyor 30, which can be driven by a drive (not explicitly shown). A plurality of transport trolleys 31 is fastened to the transport chain. By moving the transport chain in the transport direction T1, the transport trolleys 31 are also moved in the transport direction T1 along the first transport path. The transport trolleys 31 comprise guide and/or sliding rollers 32, by means of which the transport trolley 31 can travel on or along a transport rod 33. A guide rod 34 is arranged below the transport rod 33, which guide rod is configured and adapted for guiding the transport trolley 31 rolling on the transport rod 33. Each transport trolley 31 comprises means 35 for clamping the giblet bundle 15, or parts thereof, on the heart 12 and/or on the lungs 13, and for releasing it again. The means 35 for clamping may be configured so as to be self-clamping, but preferably comprises actively actuatable clamping jaws for opening and closing thereof.

In addition to the guide rod 34 for the transport trolley 31 itself, guide means 36 for trapping and positioning the heart 12, clamped in the transport trolley 31, and the lungs 13 are associated with the transport conveyor 30. The guide means 36 is positioned below the guide rod 34 for the transport trolley 31, and comprises at least two guide rods 37, 38. In the inlet region E of the giblet bundle 15 into the guide means 36, the guide rods 37, 38 are provided with a large spacing. In transport direction T1, the guide rods 37, 38 initially extend towards one another. The guide rods 37, 38 are then—in the region of the means 25 for removing the heart 12 and lungs 13 positioned on the end of the guide means 36—at least in portions, substantially oriented in the transport direction T1 and spaced apart from one another. Preferably, the guide rods 37, 38 for orienting the trapped and positioned heart 12 and/or the lungs 13 are shaped not only with respect to the means 25 for removing the heart 12 and lungs 13, but also with respect to the means 35 for clamping the giblet bundle 15 or parts thereof.

Furthermore, the guide rods 37, 38 are arranged so as to be height-offset relative to one another. One guide rod 37, 38, preferably the lower guide rod 38, is assigned a guide plate 39, by means of which spatial separating of heart 12 and lungs 13 still connected to the giblet bundle 15, on the one hand, and the remaining components of the giblet bundle 15, on the other hand, can be achieved, and, on the other hand, the remaining components of the giblet bundle 15 can be brought into an inclined position. During transport of the giblet bundle 15 along the first transport path, in the transport direction T1, the heart 12 and lungs 13 thread into the guide slot 40 formed between the two guide rods 37, 38, and are pushed by the guide rods 37, 38 to the desired level, namely to the level of the means 25 for removing the heart 12 and lungs 13. The remaining components of the giblet bundle 15 slide along on the side of the guide plate 39 remote from the guide slot 40, and are slightly raised by the guide plate 39, which has a defined inclination relative to the vertical.

A cooling element (not explicitly shown) is arranged in the region of the guide means 36, by means of which cooling element the giblet bundle 15 suspended on the transport trolley 31 can be cooled during transport along the first transport path. The cooling element can for example be a tank positioned under the guide means 36, which is filled with iced water. In other embodiments, for example nozzles can also be arranged in the region of the guide plate 39, by means of which nozzles for example liquid nitrogen can be applied at least to the components of the giblet bundle 15 sliding along on the guide plate 39. Optionally, the cooling element can also be arranged clearly upstream of the guide means 36 in the transport direction T1, such that the cooling of the giblet bundle 15 already takes place immediately after the evasceration.

The first transport path of the transport means 21 leads directly in the direction of the means 25 for removing the heart 12 and lungs 13. The means 25 for removing the heart 12 and the lungs 13 from the giblet bundle 15, arranged in the region of the end of the guide means 36, comprises a circular knife 41 which can be driven in a rotating manner, or another cutting means. A stretching means 42 is associated with the circular knife 41. The stretching means 42 is arranged in the region of the circular knife 41, such that the giblet bundle 15 to be processed encounters the stretching means 42 immediately before reaching the circular knife 42. The stretching means 42 is a kind of spreader clamp, which is configured and adapted for stretching the tissue between the heart 12 and lungs 13 on the one hand, and the remaining components of the giblet bundle 15 on the other hand, such that the circular knife 41 encounters the stretched tissue. A separator (not shown) for separating the heart 12, separated from the giblet bundle 15, from the lungs 13, may be arranged under the circular knife 41. For example, the separator can be formed of two spiral rollers or the like, which can be driven in opposite directions.

In the region of the guide plate 39, a transfer position U is configured between the transport means 21 for transporting the giblet bundle 15 held on the heart 12 and/or on the lungs 13, or parts of said package, along the first transport path, and the transport means 24 for transporting parts of the partial giblet bundle 15a comprising the liver 11, along the second transport path, such that the transport trolley 31 clamping the heart 12 and the lungs 13 can be moved along the first transport path, independently of the means 23, holding the partial giblet bundle 15*a* freed of the heart 12 and lungs 13, and also of the gall bladder 16 and intestines 19, for holding the partial giblet bundle 15*a* in the region of the gizzard 14, along the second transport path. In the transfer region Ü, the giblet bundle 15 is briefly held or clamped at two positions. After separation of the heart 12 and lungs 13 from the giblet bundle 15, the heart 12 and lungs 13 are initially transported further along the first transport path, while the partial giblet bundle 15*a* is transported further along the second transport path.

Figure 2A:
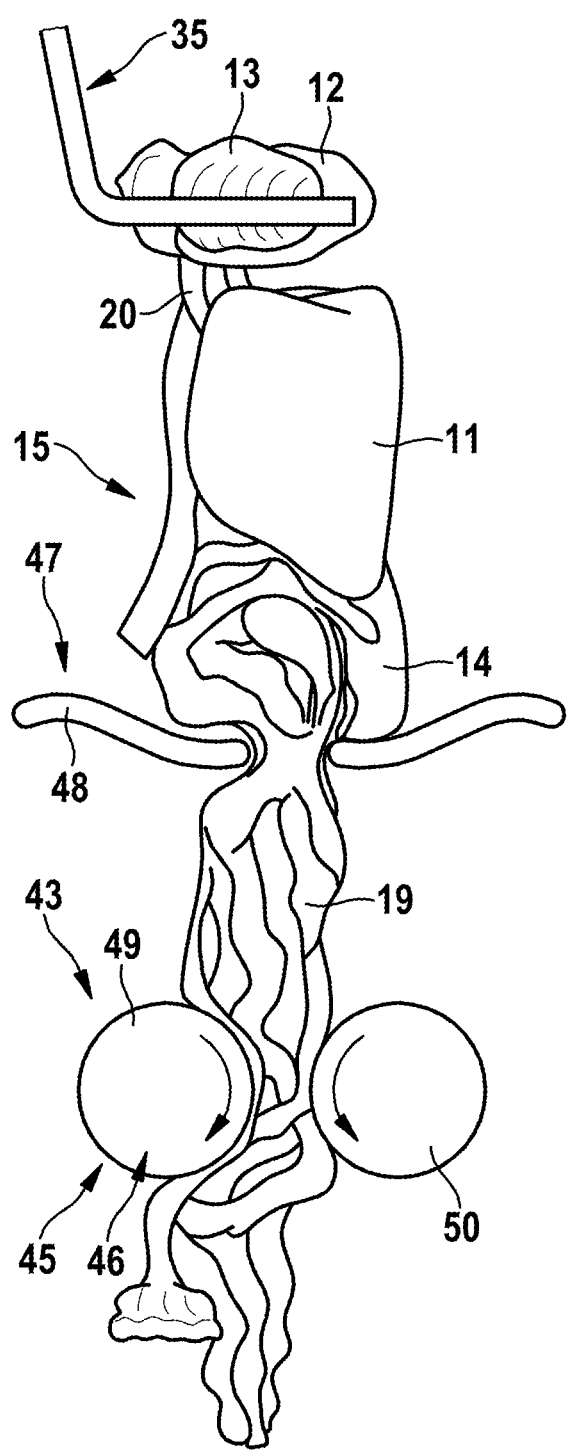
FIG. 2a is a side view of the giblet bundle according to FIG. 1, in which a stretching station for stretching the intestines, as a component of a means for removing the gall bladder and the intestines, is engaged with the giblet bundle.
Figure 2B:
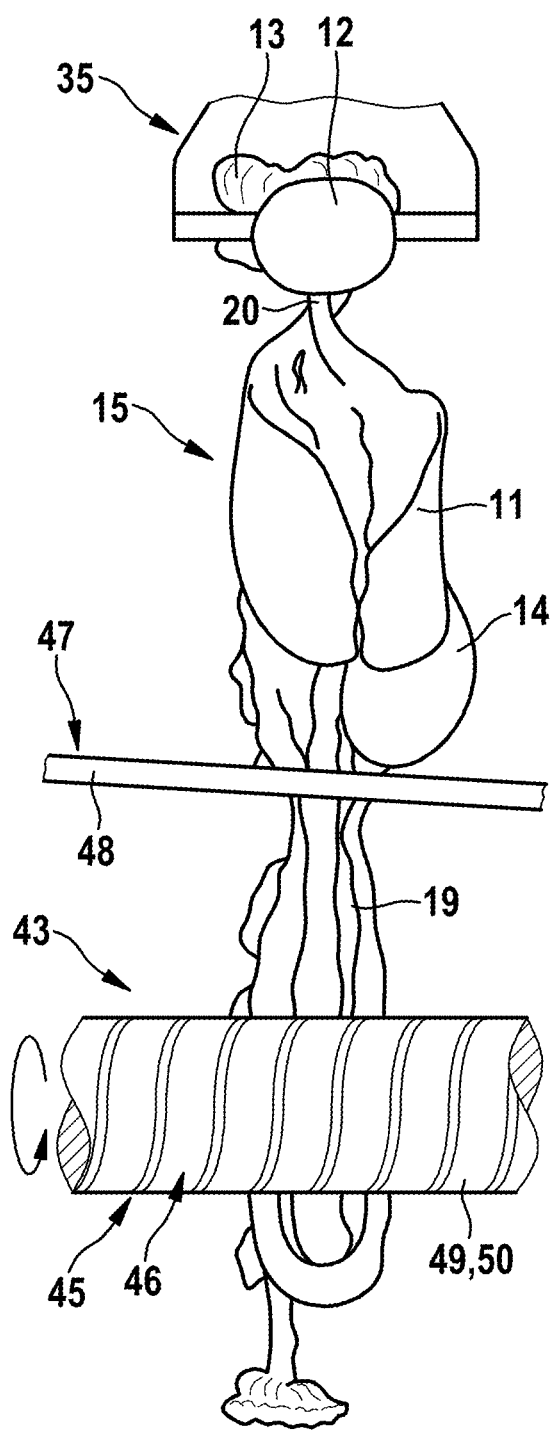
Figure 3A:
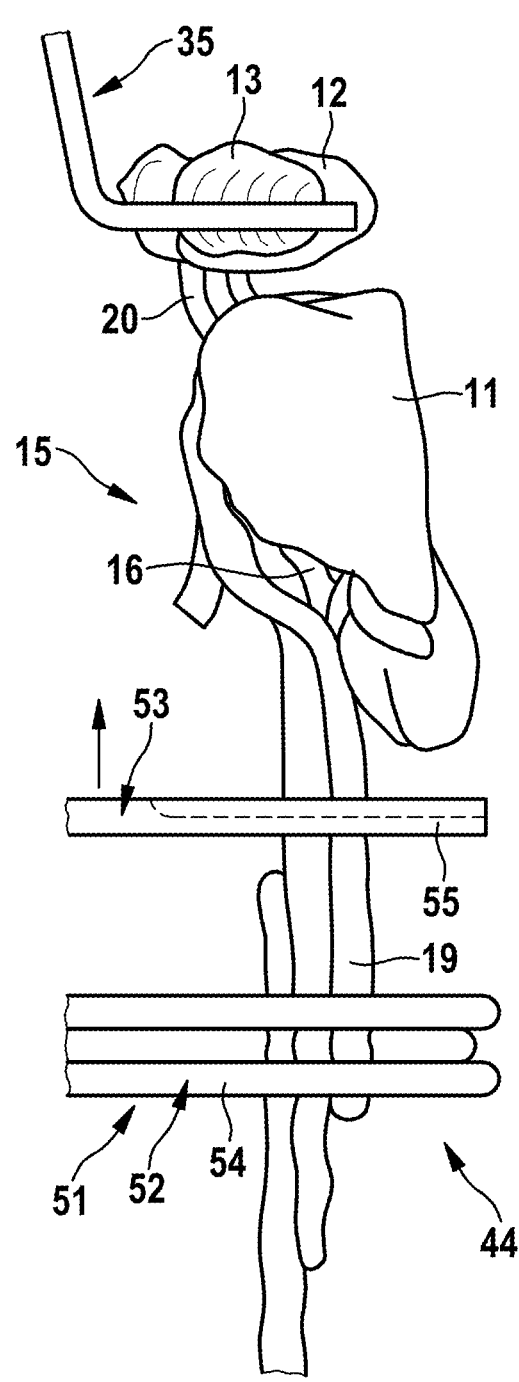
FIG. 3a is a side view of the giblet bundle according to FIG. 2, in which a separation station for separating the stretched intestines and the gall bladder, as a component of the means for removing the gall bladder and the intestines, is engaged with the giblet bundle.
Figure 3B:
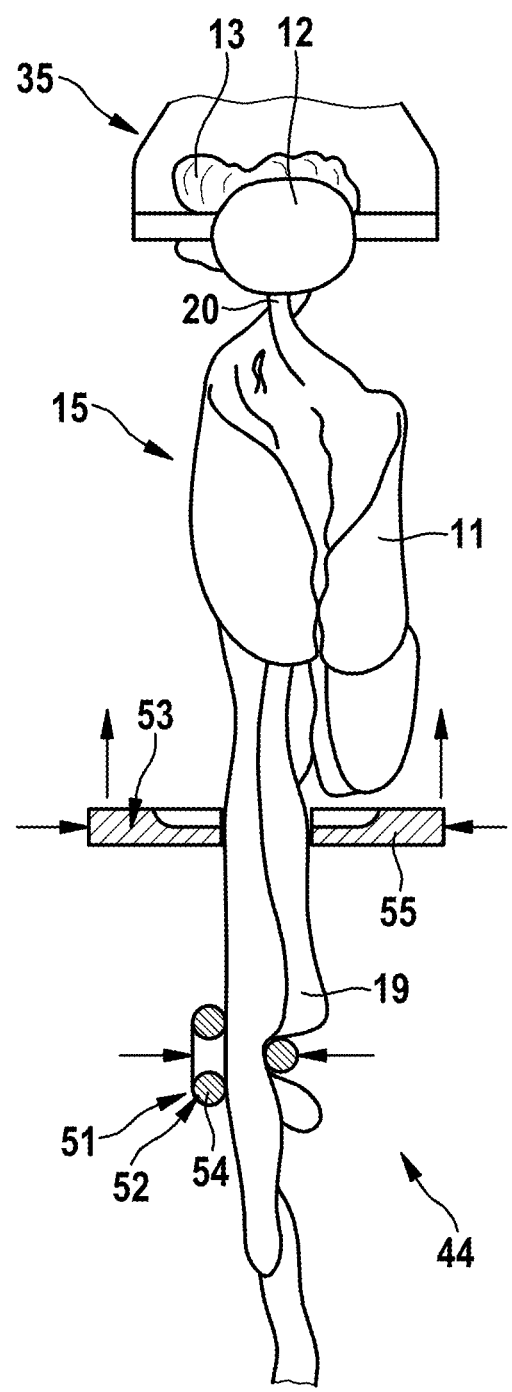
Figure 4A:
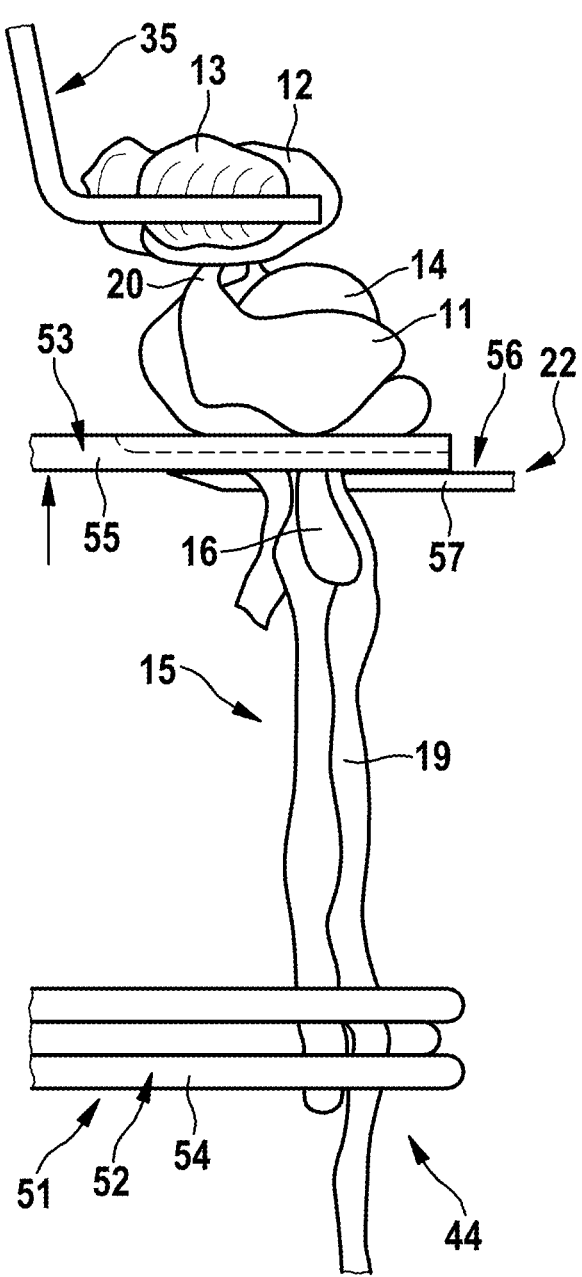
FIG. 4a is a side view of the representation according to FIG. 3a, with separated intestines and separated gall bladder under a lifting element as a component of the separation means.
Figure 4B:
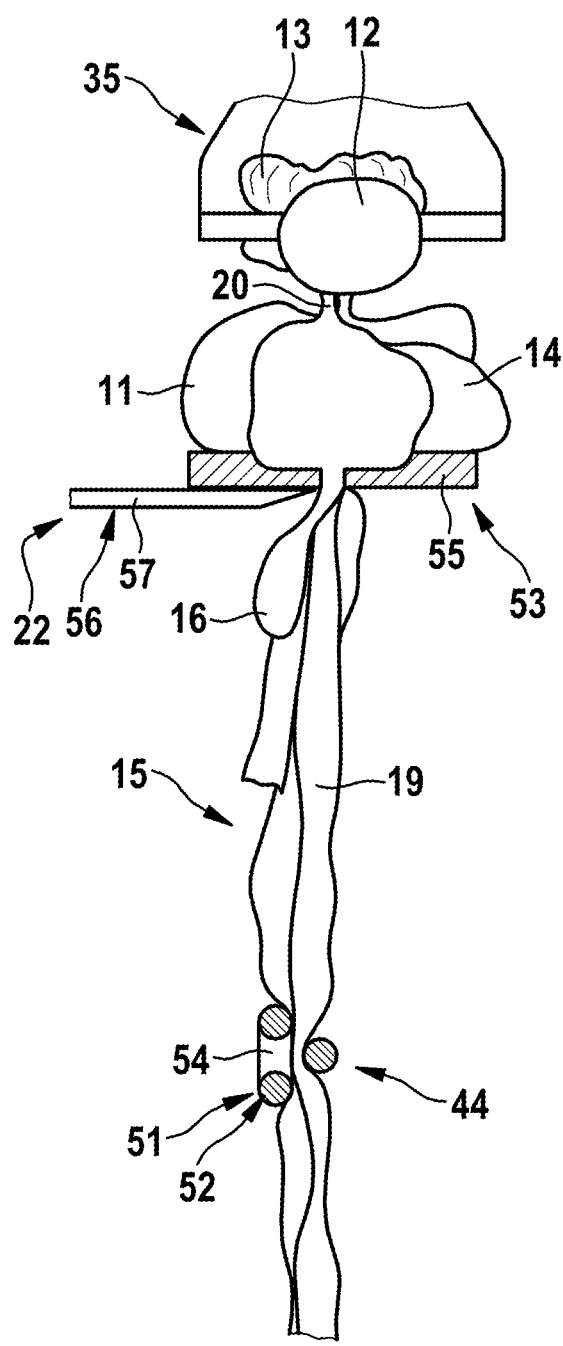
Figure 5A:
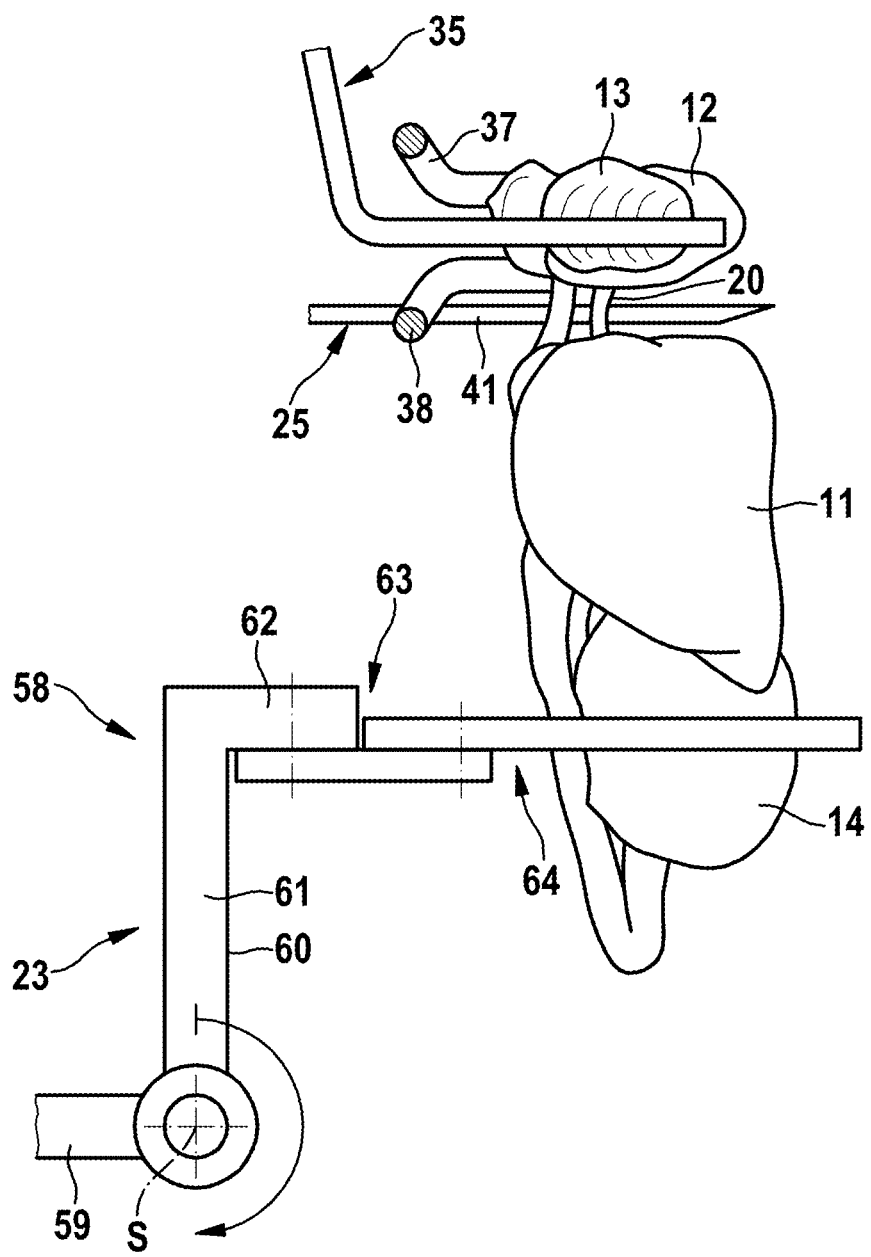
FIG. 5a is a schematic side view of the giblet bundle that is freed of the intestines and gall bladder and is clamped and suspended in the region of the heart and/or the lungs, in which a means for holding the giblet bundle in the region of the gizzard is engaged with the giblet bundle, the means for holding the giblet bundle in the region of the gizzard being in a receiving position.
Figure 5B:
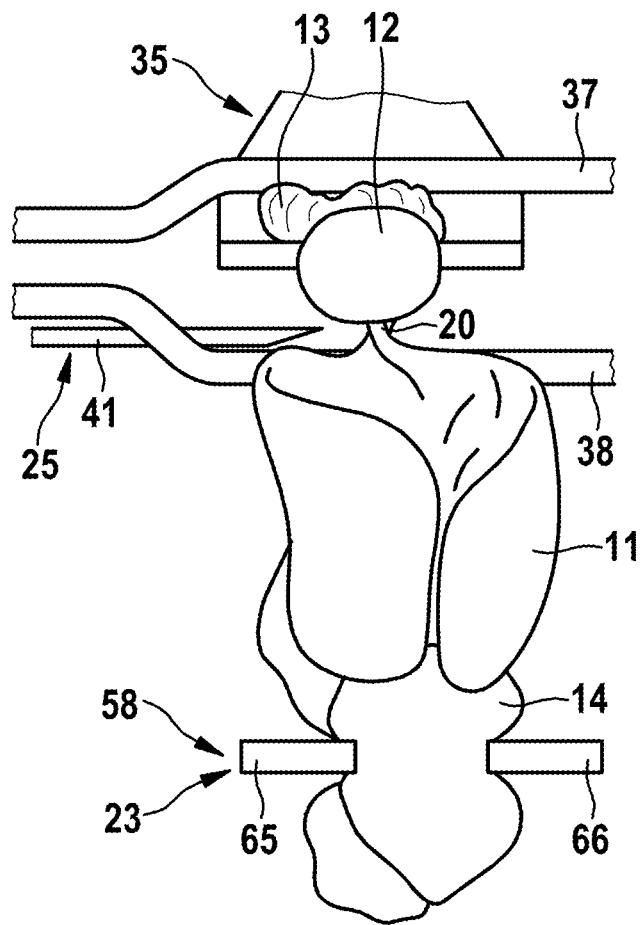
Figure 6A:
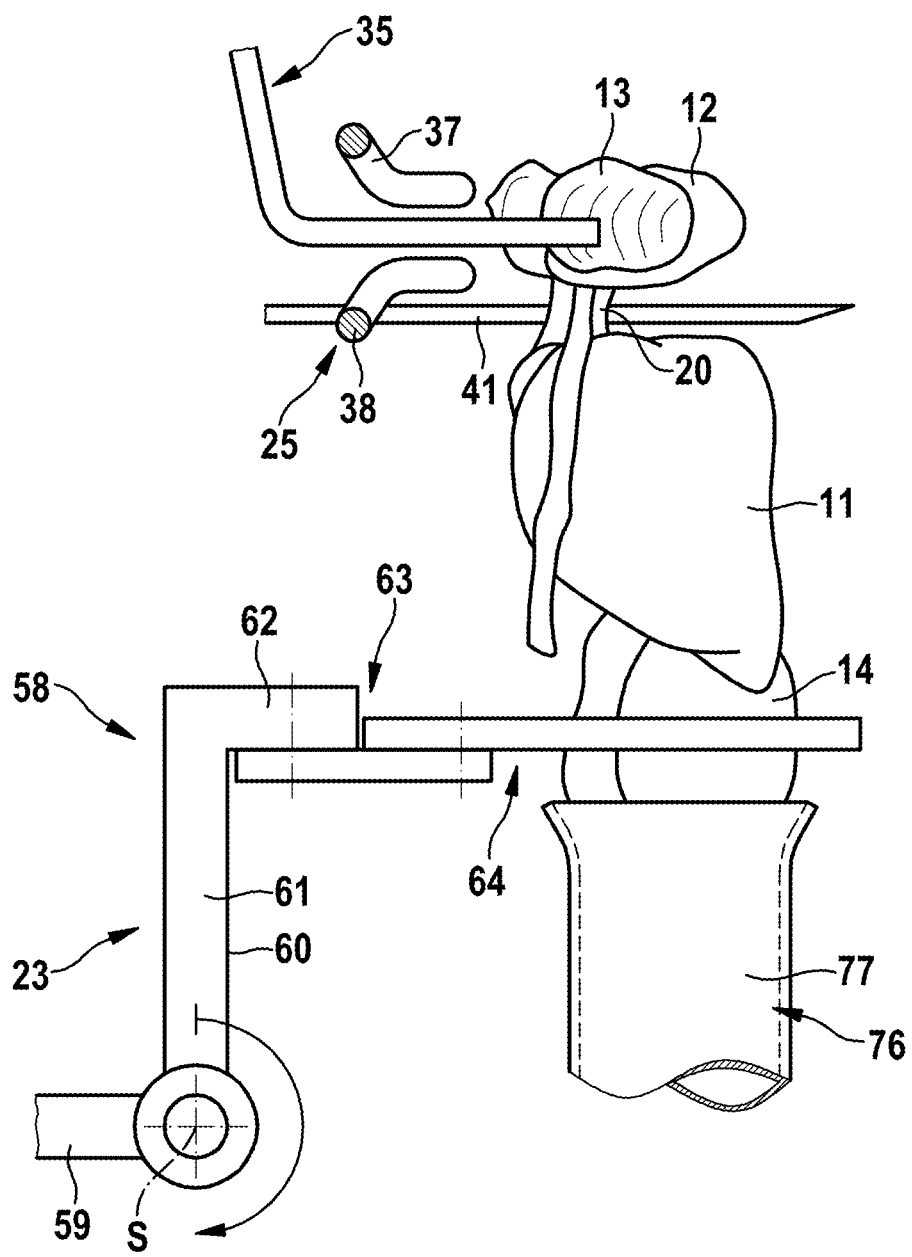
FIG. 6a is a side view of the representation according to FIG. 5, comprising additional holding means for holding the gizzard.
Figure 6B:
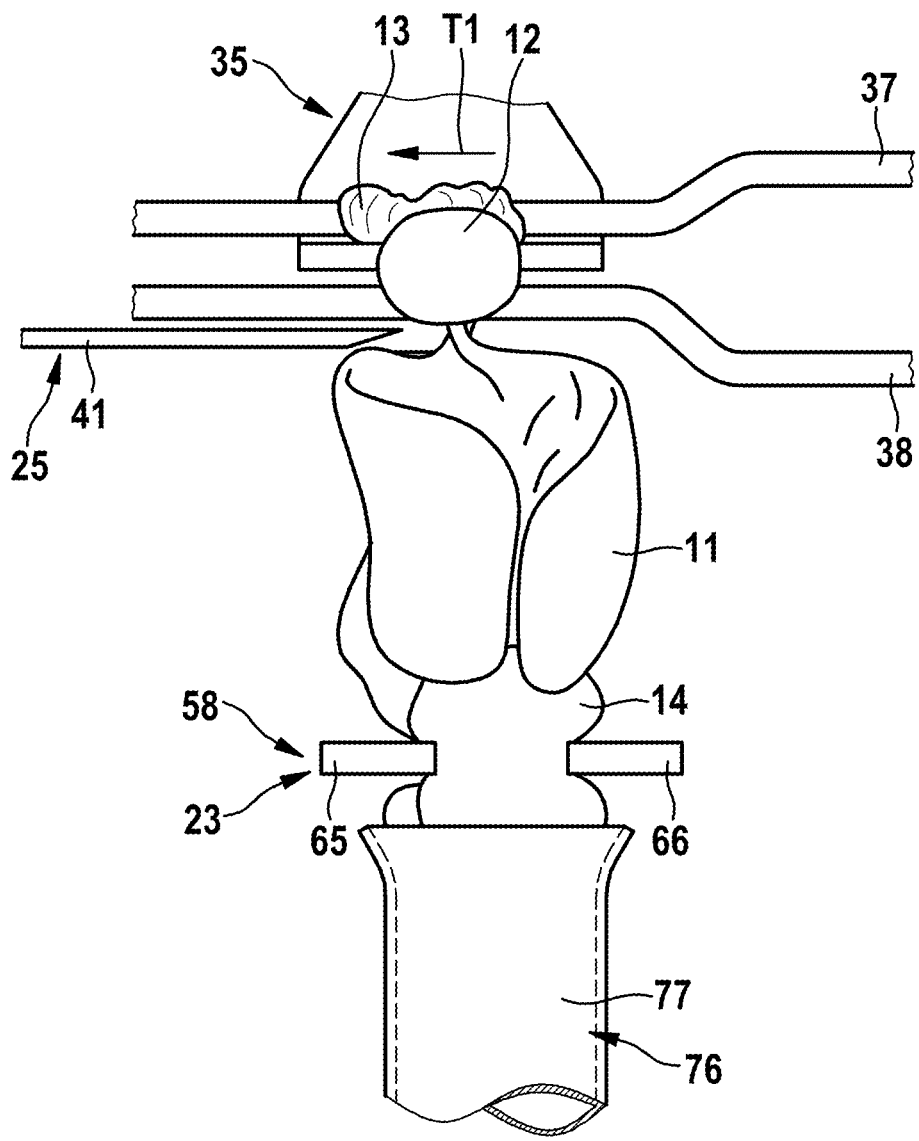
Figure 7A:
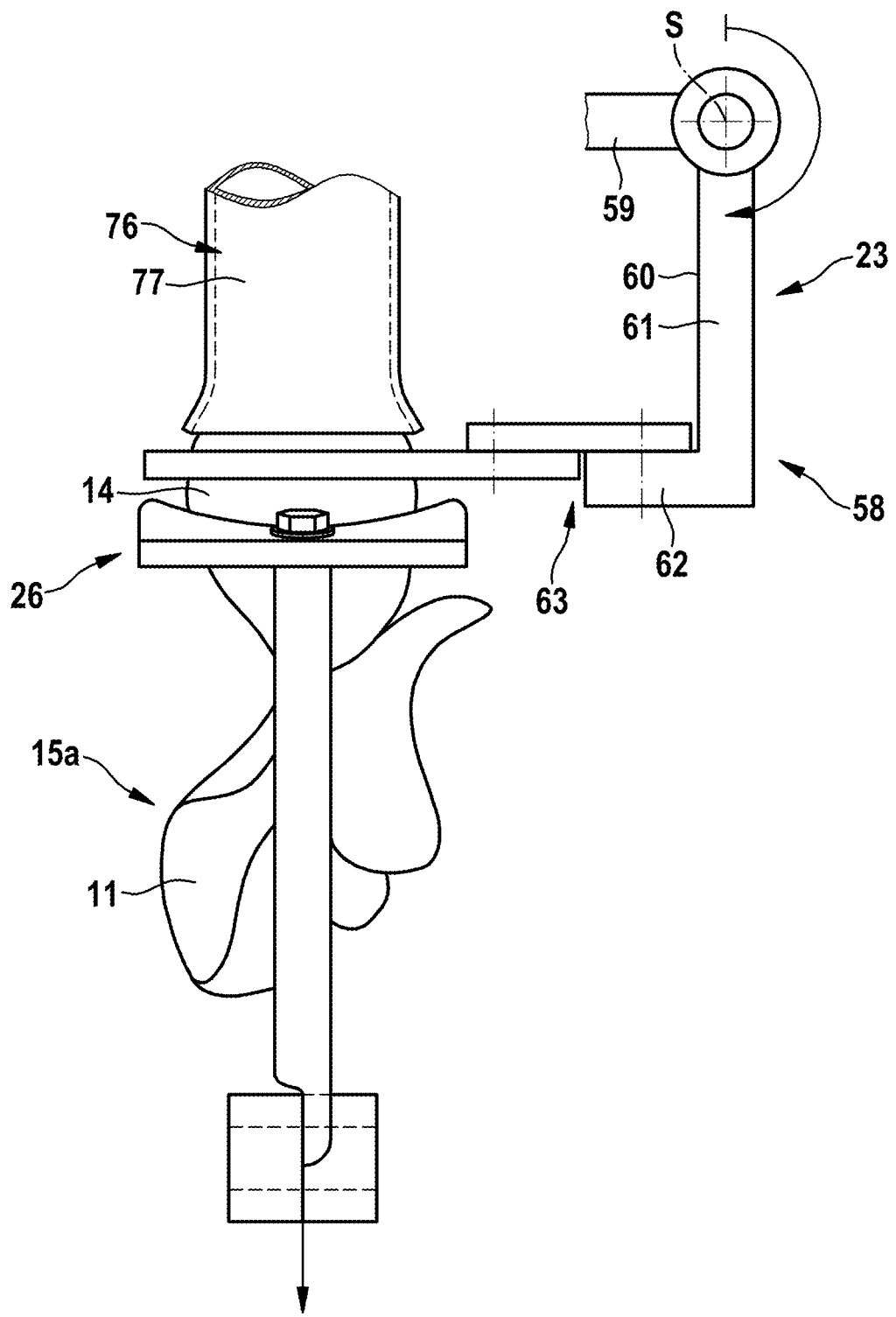
FIG. 7a is a schematic side view of a partial giblet bundle that is freed of the gall bladder, intestines, heart and lungs, in which the means for holding the partial giblet bundle in the region of the gizzard is engaged with the gizzard, the means for holding the giblet bundle being located in a processing position that is pivoted about approximately 180°, and a means for stripping the liver being located immediately before the engagement with the liver.
Figure 7B:
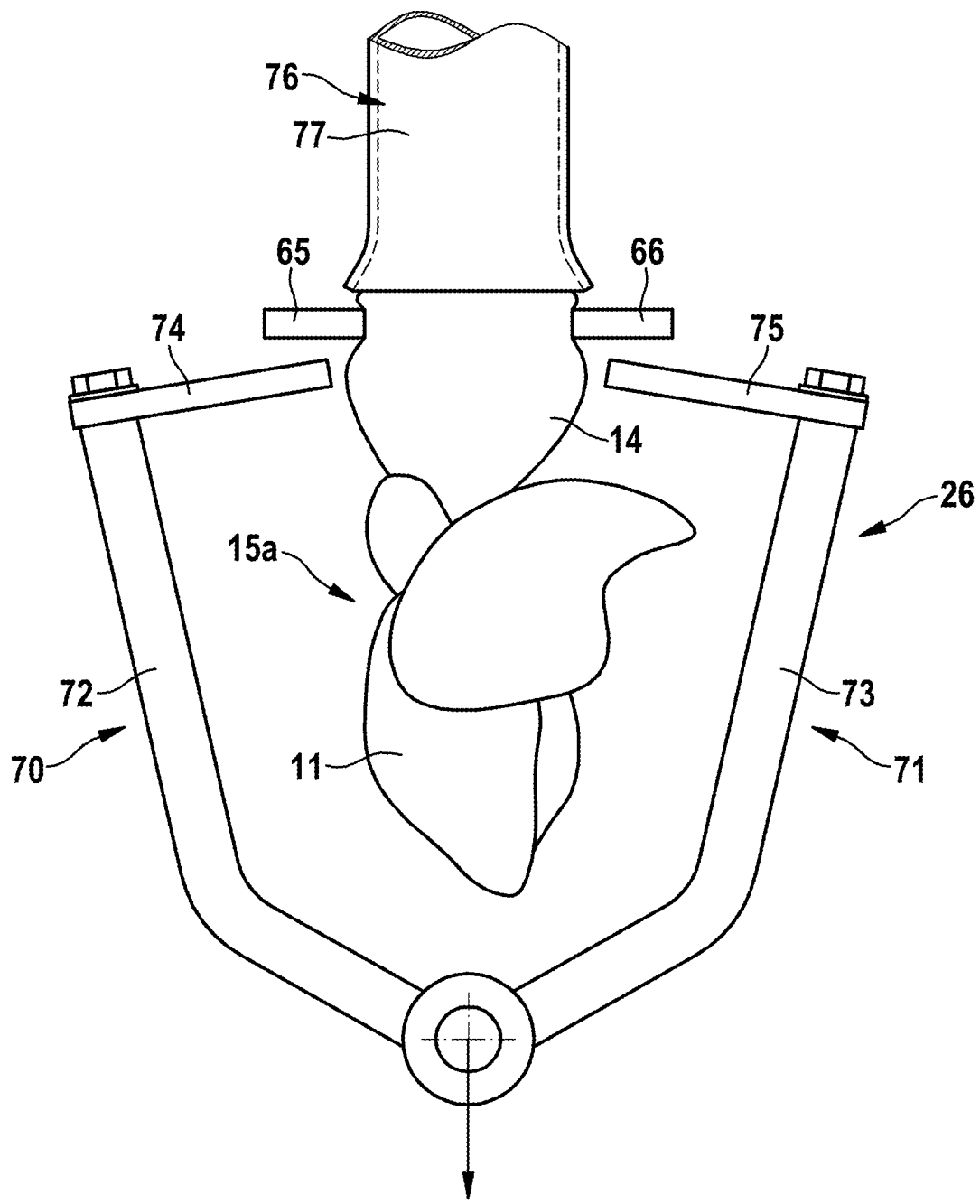
Figure 8A:
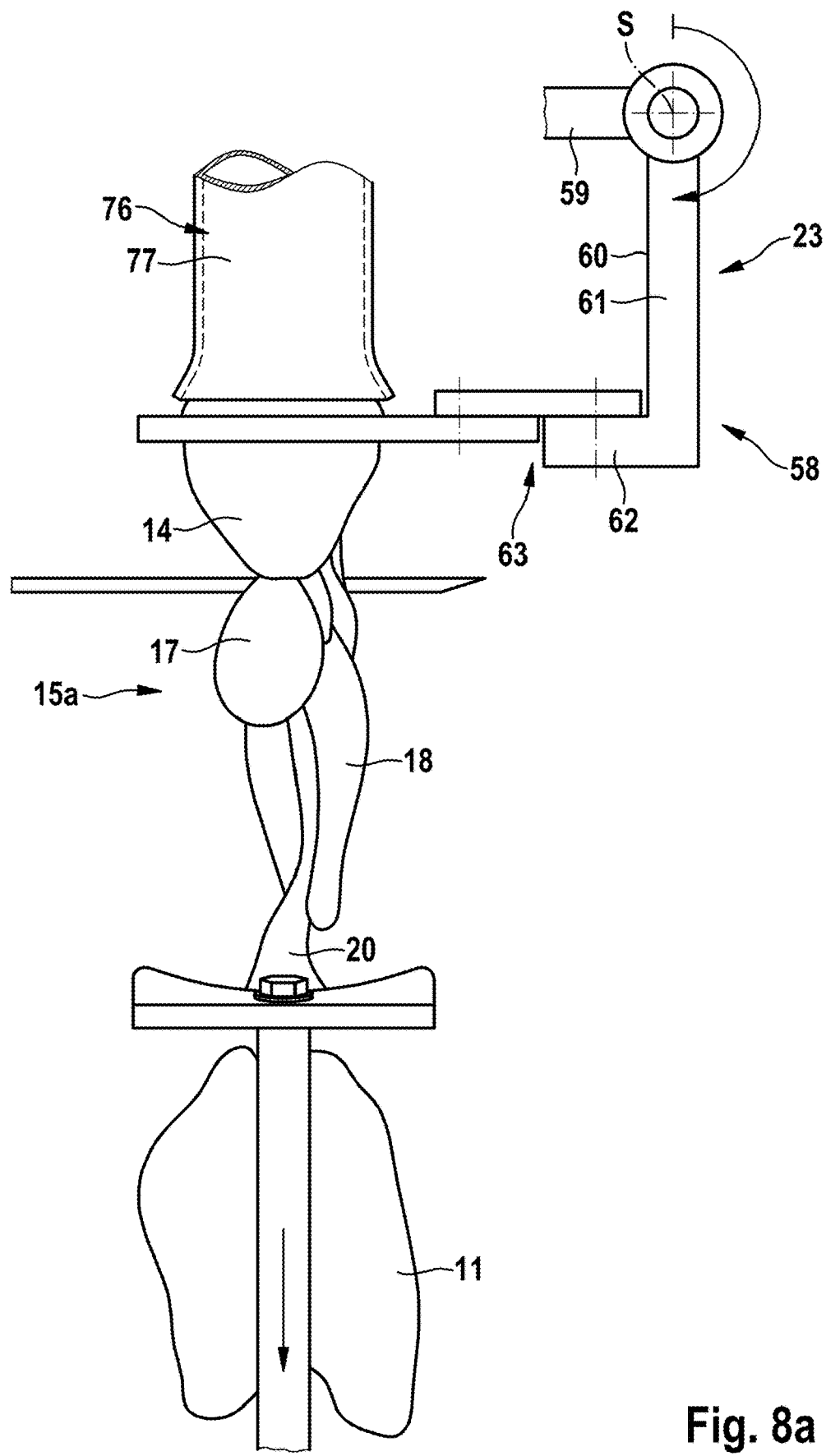
FIG. 8a is a side view of the representation according to FIG. 7, comprising the removed liver.
Figure 8B:
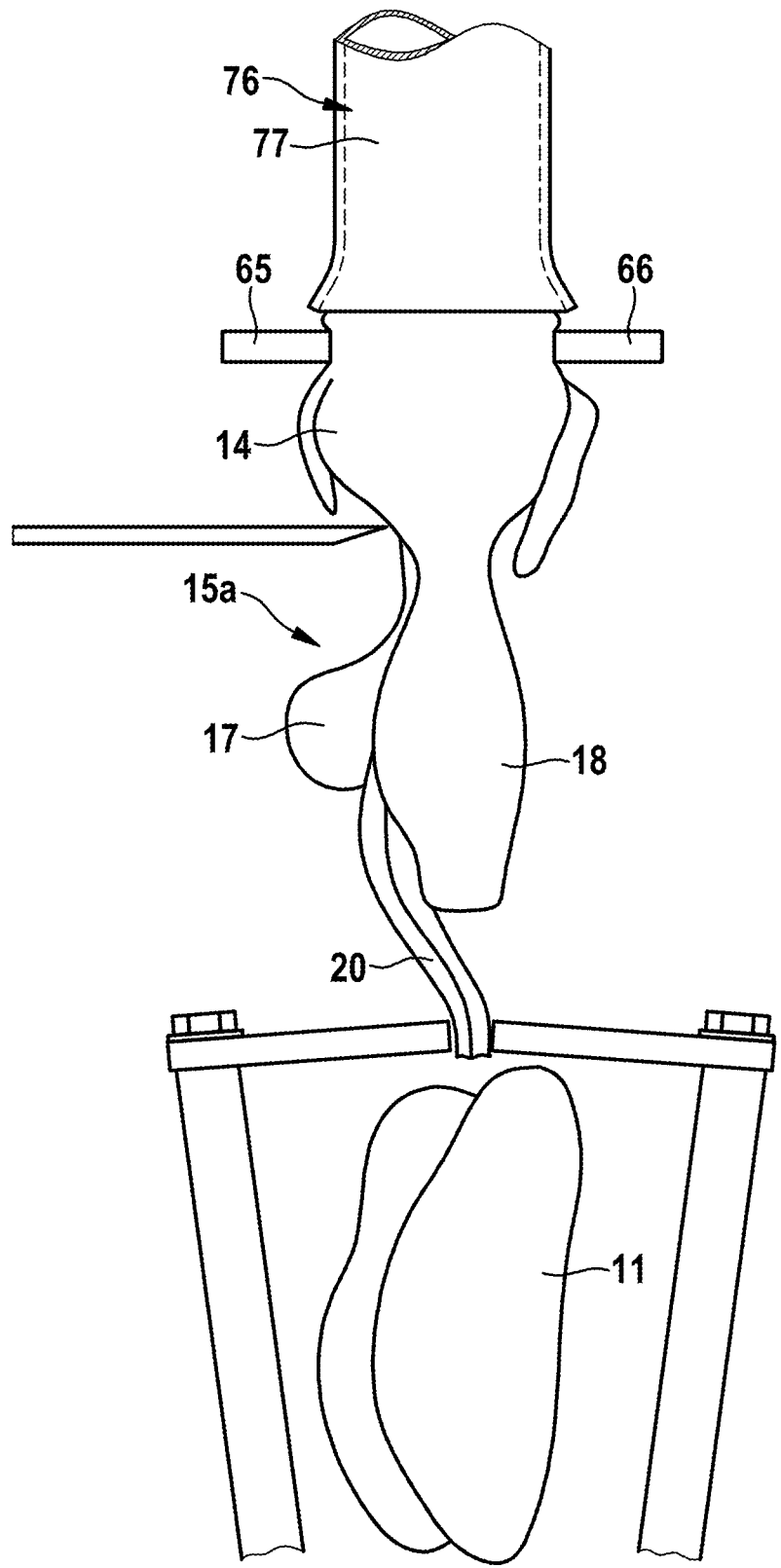

In the embodiment shown, the means 22 for removing the gall bladder 16 and the intestines 19 is arranged upstream, in the transport direction T1, from the means 23 for holding the giblet bundle 15, still suspended on the heart 12 and/or on the lungs 13, in the region of the gizzard 14, and comprises a stretching station 43 (see in particular FIGS. 2*a* and 2*b*) and a separation station 44 (see in particular FIG. 3*a*, 3*b*, 4*a*, 4*b*). In the embodiment shown, the giblet bundle 15 first reaches the stretching station 43, the stretching station 43 comprising stretching means 45 for stretching the intestines 19. The stretching means 45 is arranged in stationarily on a frame or the like, and comprises at least one pair of stretching rollers 46 and at least one counterhold element 47 which is arranged so as to be spaced apart from the pair of stretching rollers 46. The counterhold element 47 is arranged above the pair of stretching rollers 46 and is configured and adapted for receiving and holding the intestines 19 in the transition region to the gizzard 14 and/or proventriculus 18. For this purpose, the counterhold element 47 comprises at least one holding and/or guide rod 48. The pair of stretching rollers 46 comprises two stretching rollers 49, 50 which can be driven in opposite directions. The pair of stretching rollers 46 and the counterhold element 47 interact such that the stretching rollers 49, 50 of the pair of stretching rollers 46 pull on the intestines 19, while the counterhold element 47 applies a counterforce by holding the components of the giblet bundle 15 adjoining the intestines 19 securely.

The separation station 44 is arranged behind the stretching station 43, in the transport direction T1. The separation station 44 comprises separation means 51 for separating the intestines 19 and the gall bladder 16 from the other components of the giblet bundle 15. The separation means 51 is configured and adapted for receiving the giblet bundle 15, comprising the stretched intestines 19, from the stretching means 45 (see in particular FIG. 3*a*, 3*b*), and comprises at least one clamping device 52 and at least one lifting element 53. The lifting element 53 is arranged above the clamping device 52. The clamping device 52 comprises clamping bodies 54 for clamping the intestines 19. The or each clamping body 54 can be configured so as to be stationary. Said stationary arrangement refers in particular to the vertically oriented position. In order to clamp and release the intestines 19, the or each clamping body 54 can be movable, in particular in the horizontal orientation.

The or each lifting element 52 comprises at least one lifting body 55 which is configured so as to be movable back and forth, preferably in the horizontal direction, and up and down, preferably in the vertical direction. Each lifting element 53 or each lifting body 55 is configured and adapted to be movable from a lower receiving position (see in particular FIG. 3*a*, 3*b*) for receiving or taking over the stretched intestines 19 into an upper separating position (see in particular FIGS. 4*a* and 4*b*), and back, such that the intestines 19 and the gall bladder 16 are located under each lifting element 53, in the separation position.

The separation means 51 further comprises a separating device 56 for separating the gall bladder 16 and the intestines 19, located under each lifting element 53, from the giblet bundle 15 which still comprises at least the heart 12, lungs 13, liver 11, gizzard 14, spleen 17, proventriculus 18, and trachea and oesophagus 20. The separating device 56 comprises a blade 57 which is configured and adapted for engaging/cutting under the lifting element 53. The blade 57 is configured and adapted so as to be movable from a waiting position into a cutting position, and back.

Figure 9:
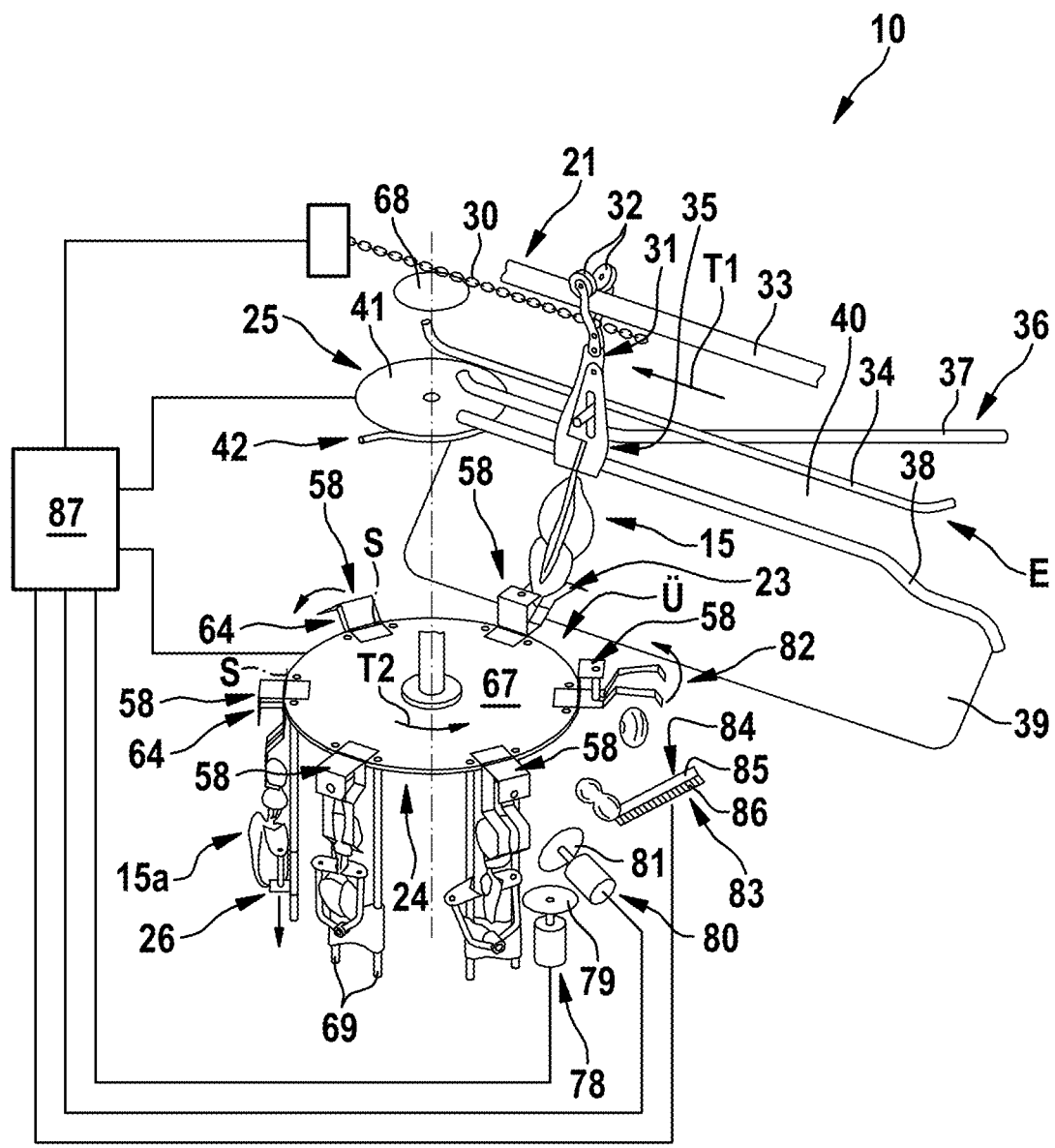
FIG. 9 is a schematic view of an apparatus for automatic harvesting of organs and components from a giblet bundle of slaughtered poultry, comprising some of the processing stations shown in FIGS. 1 to 8.

For the purpose of further processing of the partial giblet bundle 15*a* freed of the heart 12, lungs 13, gall bladder 16 and intestines 19, said partial giblet bundle can be transported, by the transport means 24, along the second transport path in the transport direction T2. In this case, the partial giblet bundle 15*a* is held by the means 23 for holding the partial giblet bundle 15 in the region of the gizzard 14, which means comprises, for this purpose, at least one holding apparatus 58 comprising a support arm 59 and a pivot arm 60 hingedly arranged on the support arm 59. In the embodiment shown according to FIG. 9, six holding apparatuses 58 are evenly distributed over the periphery of the transport means 24 and arranged thereon. The transport means 24 is a rotational conveyor which can be driven in a rotating manner, in the transport direction T2, using drive means, which are not explicitly shown. The support arm 59 is arranged on the transport means 24 for transporting parts of the partial giblet bundle 15*a*, comprising the liver, along the second transport path T2. The support arm 59 is preferably fastened in a detachable manner.

The pivot arm 60 is configured so as to be pivotable, after removal of the heart 12 and the lungs 13 from the giblet bundle 15, about a pivot axis S, out of a receiving position (FIG. 5*a*, 5*b*, 6*a*, 6*b*), about approximately 180°, into a processing position (see FIG. 7*a*, 7*b*, 8*a*, 8*b*), and back. The holding apparatus 58 is configured quasi in the manner of a folding hinge, and allows a pivot movement about 180°. In the embodiment shown, the pivot arm 60 can be pivoted out of a vertically upwardly directed position into a vertically downwardly directed position, and back. The pivot arm 60 is configured so as to be L-shaped. The pivot arm 60 is mounted by a long arm 61 thereof on the support arm 59. A short arm 62 forms a free end 63 which, in the receiving position, faces in the direction of the partial giblet bundle 15*a* to be processed or held. A clamping device 64 is arranged on the free end 63 of the pivot arm 60, which apparatus is configured and adapted for clamping the gizzard 14. The clamping device 64 can be arranged in a stationary or adjustable manner on the pivot arm 60 and, in the embodiment shown, comprises two clamping jaws 65, 66 which are movable towards and away from one another. The clamping jaws 65, 66 may be self-clamping or actively controllable, for example by means of a pneumatics unit or the like.

The transport means 24 for transporting the partial giblet bundle 15*a* comprising the liver 11 along the second transport path comprises a rotary plate 67, the rotary plate 67 being configured and adapted such that it can be synchronised, by means of a synchronisation element 68, with the transport conveyor 30 of the transport means 21 for transporting the giblet bundle 15 held on the heart 12 and/or on the lungs 13, or parts thereof, along the first transport path. In the embodiment shown, the synchronisation element 68 is a synchronisation wheel for mechanical synchronisation of the transport speeds. The transport means 24 preferably comprises a second rotary plate (not explicitly shown), which is arranged so as to be spaced apart from the first rotary plate 67 and is connected thereto in order to form the rotary—or also carousel-conveyor. The connection of the two rotary plates 67 can be established for example by means of support or guide rods 69. The transport means 24 preferably comprises six or more such holding apparatuses 58, which are all arranged on the rotary plate 67.

Each means 23 for holding the giblet bundle 15 still suspended on the heart 12 and/or on the lungs 13, or the partial giblet bundle 15*a*, in the region of the gizzard 14, i.e. every holding apparatus 58, is associated with a respective means 26 for stripping the liver 11, hanging downwards, from the partial giblet bundle 15*a*. By means of the pivot arm 60 of the holding apparatus 58, the partial giblet bundle 15*a* comprising the liver 11 arrives in the working/operatingrange of the means 26 for stripping the liver 11. The means 26 for stripping the liver 11, hanging downwards, from the partial giblet bundle 15*a* itself is configured and adapted so as to be movable relative to the means 23 for holding the partial giblet bundle still suspended on the heart 12 and/or on the lungs, or the partial giblet bundle 15*a*, in the region of the gizzard 14. For this purpose, the means 26 for stripping the liver 11, hanging downwards, from the partial giblet bundle 15*a*, is configured and adapted so as to be movable up and down along at one guide rod 69. Preferably, the means 26 for stripping the liver 11, hanging downwards, from the partial giblet bundle 15*a*, is movably guided on two linear guide rods 69 using drive means (not shown explicitly). Each holding apparatus 58 forms, together with a means 26 for stripping, a processing unit which is driven in a revolving manner using the transport means 24.

The means 26 for stripping comprises two scraper elements 70, 71 which are movable relative to one another, and which are made at least partially from a flexible materialf on their inner sides facing one another. The pincer-like scraper elements 70, 71 are preferably controllable such that they can be moved towards and away from one another, using a drive means (not shown). In the embodiment shown, the scraper elements 70, 71 are configured as holding arms 72, 73, at the free ends of which in each case one scraper lip 74, 75 is arranged. The scraper lips 74, 75 are made of a flexible material and are detachably fastened to the holding arms 72, 73.

The holding apparatus 58 for holding the giblet bundle 15 or the partial giblet bundle 15*a* can comprise a vacuum holding device 76 as an alternative or in addition to the support arm 59 and pivot arm 60. The vacuum holding device 76 serves to suction and hold at least parts of the gizzard 14. For this purpose, the vacuum holding device 76 comprises a vacuum cap 77, which is operatively connected to a vacuum device (not shown). The vacuum holding device 76 can also be arranged pivotably on the transport means 24.

Each processing unit, formed of the holding apparatus 58 and means 26 for stripping, also forms a processing station. Following the stripping of the liver 11 from the partial giblet bundle 15*a*, the partial giblet bundle 15*a* freed of the liver 11 can be transported, in the transport direction T2, to further processing stations. A means 78 for removing the proventriculus 18 and/or a means 78 for removing the spleen 17 from the partial giblet bundle 15*a* freed of the liver 11 is arranged along the second transport path of the transport means 24 for transporting the partial giblet bundle 15*a*. In the embodiment shown, the means 78 for removing the spleen 17 and proventriculus 18 are configured as a common circular knife 79. The circular knife 79 is preferably configured and adapted so as to be movable from a waiting position into a cutting position, and back. However, separate separating means can also be provided.

A means 80 for cutting open the gizzard 14 is arranged along the second transport path of the transport means 24 for transporting the partial giblet bundle 15*a*, in the region of the means 78 for removing the proventriculus 18 and/or the spleen 17, or downstream thereof in the transport direction T2. The means 80 for cutting open the gizzard 14, still held in the holding apparatus 58, is preferably a circular knife 81. The circular knife 81 is preferably configured and adapted so as to be movable from a waiting position into a cutting position, and back.

An output station 82 for the gizzard 14 from the means 23 for holding the partial giblet bundle 15*a* is configured, along the second transport path of the transport means 24 for transporting the partial giblet bundle 15*a* in the transport direction T2, behind the means 78 for removing the proventriculus 18 and/or the spleen 17, a means 83 for removing yellow skin of the gizzard 14 being arranged in the region of the output station 82. The means for removing the yellow skin is preferably arranged under the output station 82, such that the released and cut-open gizzard 14 falls directly onto the means 83 for removing the yellow skin, which comprises a roller pair 84, two skinning rollers 85, 86 of the roller pair 84 being configured and adapted so as to be driveable in opposite directions. During the removal of the yellow abdominal skin, the gizzard 14 can also still be held such that the release takes place only after the removal of the yellow stomach skin.

In order to automatically harvest individual organs and/or individual components of the giblet bundle 15 or partial giblet bundle 15*a*, the apparatus 10 is connected to a controller 87 for controlling the transport means 21, 24 and all the processing stations. In particular, in addition to the transport conveyor 30 and the rotary plate 67 as transport means 21 and 24, respectively, the means 22 for removing the gall bladder 16 and intestines 19, the means 35 for clamping the heart 12 and/or lungs 13, the means 23 for holding the giblet bundle 15 or partial giblet bundle 15*a* in the region of the gizzard 14, the means 25 for removing the heart 12 and lungs 13, the means 26 for stripping the liver 11, the means 78 for removing the spleen 16 and/or proventriculus 18, the means 80 for cutting open the gizzard 14, and the means 83 for removing the yellow skin from the gizzard 14, are also connected to the controller 87.

In the following, the method according to the invention will be described in greater detail with reference to the drawings.

The method serves for the automatic harvesting of edible components, in particular of a liver 11, a heart 12, lungs 13, and a gizzard 14, from a giblet bundle 15 removed from slaughtered poultry which, in addition to the edible components, includes further giblet components, in particular a gall bladder 16, a spleen 17, a proventriculus 18, intestines 19, and a trachea and oesophagus 20.

Said method is characterised, according to the invention, in that it comprises the following steps:

The giblet bundle 15, held on the heart 12 and/or on the lungs 13, is transported, after having been completely removed from the slaughtered poultry, along a first transport path. Along the first transport path, a processing station is provided, by means of which the gall bladder 16 and the intestines 19 are removed from the giblet bundle 15. In parallel or subsequently, the giblet bundle 15, still suspended on the heart 12 and/or the lungs 13 and freed from the gall bladder 16 and intestines 19, is gripped and held in the region of the gizzard 14. Thus, the giblet bundle 15 is briefly held at two positions.

In this situation, the heart 12 and lungs 13 are removed from the giblet bundle 15. The partial giblet bundle 15a, held on the gizzard 14 and freed from the gall bladder 16, intestines 19, heart 12 and lungs 13—and also from the gall bladder 16 and intestines 19—is then transported along a second transport path, and in the process also pivoted about approximately 180°. Subsequently, the liver 11, hanging downwards, is removed from the partial giblet bundle 15a. Following the removal of the heart 12 and lungs 13 from the giblet bundle 15, the individual components of the giblet bundle 15 take different paths. The heart 12 and the lungs 13, removed from the giblet bundle 15, are transported further along the first transport path, in the transport direction T1, while the partial giblet bundle 15a is transported further along the second transport path, in the transport direction T2. Thus, the liver 11 located on the partial giblet bundle 15a is first cut free by the removal of the heart 12 and lungs 13, in order to then be stripped from the partial giblet bundle 15a, in an upside-down position of the partial giblet bundle 15a.

In order to facilitate the removal of individual organs or components from the giblet bundle 15, before the removal of the gall bladder 16 and the intestines 19, the intestines 19 are stretched and the stretched intestines 19 and the gall bladder 19 are spatially separated from the other components of the giblet bundle 15. By means of the stretching of the intestines 19, the giblet bundle 15 is "untangled" to a certain extent. This means that in particular the intestines 19 and the gall bladder 16 are exposed with respect to the further components of the giblet bundle 15, in order to then cut them from the giblet bundle 15 using separating means.

Optionally, the giblet bundle 15 can be cooled prior to the removal of the gall bladder 16 and the intestines 19, but preferably after the removal of the gall bladder 16 and the intestines 19 and prior to further processing. For the purpose of cooling, the hanging giblet bundle 15 can be completely or partially immersed into a cooling basin, or guided therethrough. The giblet bundle 15 freed from the gall bladder 16 and the intestines 19, and preferably cooled, is then trapped and positioned in the region of the heart 12 and of the lungs 13, such that the heart 12 and lungs 13 are arranged at the level of a means 25 clamping the heart 12 and the lungs 13, and are pressed in the direction of the outer ends of the means. As a result of this orientation and positioning, the giblet bundle 15 comprising the heart 12 and lungs 13 precisely encounters a means 25 for removing the heart 12 and lungs 13. During transport of the giblet bundle 15 in the transport direction T1 along the first transport path, the heart 12 still connected to the giblet bundle 15 and the lungs 13 still connected to the giblet bundle 15 are spatially separated from the remaining components of the giblet bundle 15. While the heart 12 and lungs 13 are accordingly oriented and positioned for removal, with respect to the means for removal, the remaining components of the giblet bundle 15 are brought into an inclined position, in order to be gripped and held in the region of the gizzard 14. The separation of the heart 12 and lungs 13 with respect to the remaining components of the giblet bundle 15 preferably takes place mechanically.

Before the heart 12 and the lungs 13 are removed from the giblet bundle 15, existing tissue connections, and thus also connections existing via the trachea and oesophagus 20, are stretched to the remaining components of the giblet bundle. This can take place for example by means of a forced increase in distance of the heart 12 and lungs 13 with respect to the remaining components of the giblet bundle 15. The means 25 for removing the heart 12 and lungs 13 then plunges into the stretched/tensed tissue connections. The still clamped components of the heart 12 and lungs 13 are then further transported, separately, in the transport direction T1 along the first transport path, released from the clamping, and, after the release, supplied directly to a separator for separating the heart 12 from the lungs 13, while the partial giblet bundle 15a freed of the heart 12 and lungs 13, and also from the gall bladder 16 and intestines 19, is transported further, for further processing, in the transport direction T2 along the second transport path.

After the gall bladder 16, intestines 19, heart 12 and lungs 13 were separated from the giblet bundle 15 in the first steps, following stripping of the liver 11 from the giblet bundle 15, the spleen 17 and/or the proventriculus 18 and/or the trachea and oesophagus 20 are removed from the still gripped and held gizzard 14. After the separating of the spleen 17, proventriculus 18 and trachea and oesophagus 20 from the partial giblet bundle 15a, ultimately just the gizzard 14 remains in the means 23 for holding the partial giblet bundle 15. The still gripped and held gizzard 14 is optionally then cut open and subsequently released. Yellow stomach skin, which is not edible, is located in the interior of the gizzard 14. Accordingly, the yellow stomach skin of the gizzard 14 is removed from the cut-open gizzard 14 by an outside edge of the cut-open and released gizzard 14 falling directly into the region of the skinning rollers 85, 86.

The removal of the yellow stomach skin can also take place when the gizzard 14 is still grasped and held. For this purpose, the gizzard 14 hangs above the skinning rollers 85, 86, such that an outer edge of the yellow stomach skin comes into engagement with the skinning rollers 85, 86, and is drawn off thereby. Only then is the gizzard 14 released.

In order to be able to automatically perform the individual processing steps, all the steps for harvesting the individual organs or further components of the giblet bundle 15b are automatically matched to one another in a manner controlled by means of a controller 87. The control also relates to the transportation of the giblet bundle 15 along the first transport path, and of the partial giblet bundle 15a along the second transport path.

Particularly preferably, the method is carried out by means of an apparatus 10 as disclosed herein.

The invention claimed is:

1. An apparatus configured and adapted for automatic harvesting of edible components of a giblet bundle removed from slaughtered poultry, the edible components comprising a liver, a heart, lungs, and a gizzard, wherein additional giblet components comprise a gall bladder, a spleen, a proventriculus, intestines, and a trachea and oesophagus, the apparatus comprising:

a transport means for transporting the giblet bundle, the transport means for transporting the giblet bundle suspended on the heart and/or on the lungs, or parts thereof, and the transport means for transporting the giblet bundle positioned along a first transport path along a plurality of processing stations, the plurality of processing stations configured for removing the gall bladder and the intestines from the giblet bundle;

a means for holding the giblet bundle in a region of the gizzard, while the giblet bundle is suspended on the heart and/or on the lungs and freed of the gall bladder and the intestines, the means for holding the giblet bundle arranged on a transport means for transporting parts of the giblet bundle, along a second transport path, a means for removing the heart and the lungs from the giblet bundle; and a means for stripping the liver, the liver hanging downwards, from the partial giblet bundle;

wherein the means for holding the giblet bundle in the region of the gizzard is configured and adapted for pivoting a partial giblet bundle, freed from the gall bladder, the intestines, the heart and lungs, about approximately 180°, such that the partial giblet bundle, together with the liver, can be transported, the liver hanging downwards, on the transport means for transporting parts of the giblet bundle.

2. The apparatus according to claim 1, wherein the transport means for transporting the giblet bundle comprises:

a transport conveyor; and at least one transport trolley arranged on the transport conveyor, the at least one transport trolley movable along the first transport path, wherein each of the at least one transport trolley comprises a means for clamping the giblet bundle, or parts thereof, on the heart and/or on the lungs, and for releasing the giblet bundle.

3. The apparatus according to claim 2, wherein the transport conveyor is associated with guide means for capturing and positioning the heart and the lungs, the guide means clamped in the transport trolley.

4. The apparatus according to claim 3, wherein the guide means comprises at least two guide rods, wherein one guide rod is associated with a guide plate such that there is spatial separating of the heart and lungs, the heart and lungs still connected to the giblet bundle, and wherein remaining components of the giblet bundle can be brought into an inclined position.

5. The apparatus according to claim 4, wherein the guide rods are arranged so as to be oriented substantially in the transport direction at least in portions, and so that the guide rods are spaced apart and offset in height relative to one another.

6. The apparatus according to claim 4, wherein the guide rods are shaped with respect to the means for clamping the giblet bundle or parts of the giblet bundle.

7. The apparatus according to claim 3, further comprising a cooling element arranged in a region of the guide means, the cooling element configured to cool the giblet bundle suspended on the transport trolley, at least in part, during transport along the first transport path.

8. The apparatus according to claim 1, wherein the means for removing the heart and the lungs from the giblet bundle is arranged in a region of an end of the guide means in transport direction, the means for removing the heart and the lungs from the giblet bundle comprising at least one circular knife.

9. The apparatus according to claim 8, further comprising a separator for separating the heart from the lungs, separated from the giblet bundle, wherein the separator is arranged under the at least one circular knife.

10. The apparatus according to claim 8, further comprising a stretching means arranged in a region of the circular knife, such that the giblet bundle encounters the stretching means immediately before reaching the at least one circular knife.

11. The apparatus according to claim 4, further comprising a transfer position configured in a region of the guide plate, between the transport means for transporting the giblet bundle held on the heart and/or on the lungs, or parts thereof, along the first transport path, and the transport means for transporting parts of the partial giblet bundle comprising the liver, along the second transport path, such that the transport trolley clamping the heart and the lungs is movable along the first transport path, independent of the means for holding the giblet bundle, holding the partial giblet bundle freed of the heart and lungs, and also of the gall bladder and intestines, for holding the partial giblet bundle in the region of the gizzard, along the second transport path.

12. The apparatus according to claim 1, wherein the means for removing the gall bladder and the intestines is arranged upstream in the transport direction from the means for holding the giblet bundle suspended on the heart and/or on the lungs in the region of the gizzard, and wherein the means for removing the gall bladder and the intestines comprises:

a stretching station, the stretching station comprising stretching means for stretching the intestines; and a separation station, the separation station comprising separation means for separating the intestines and the gall bladder from other components of the giblet bundle.

13. The apparatus according to claim 12, wherein the stretching means is arranged stationarily on a frame or the like, and comprises at least one pair of stretching rollers and at least one counterhold element arranged so as to be spaced apart from the pair of stretching rollers.

14. The apparatus according to claim 13, wherein the pair of stretching rollers comprises two stretching rollers which are driven in opposite directions, and wherein the counterhold element comprises at least one, holding and/or guide rods.

15. The apparatus according to claim 12, wherein the separation means comprises at least one clamping device and at least one lifting element, and each lifting element is configured and adapted to be movable from a lower receiving position for receiving the stretched intestines into an upper separating position, and back into the lower receiving position, such that the intestines and the gall bladder are located under each lifting element, in the upper separation position.

16. The apparatus according to claim 15, wherein the clamping device comprises clamping bodies for clamping the intestines, and the or each lifting element comprises a lifting body that can be moved back and forth and up and down.

17. The apparatus according to claim 15, wherein the separation means comprises a separating device for separating the gall bladder and the intestines, located under each lifting element, from the giblet bundle which still comprises at least the heart, lungs, liver, gizzard, spleen, proventriculus, and trachea and oesophagus.

18. The apparatus according to claim 1, wherein the means for holding the giblet bundle suspended on the heart and/or on the lungs, or the partial giblet bundle, in the region of the gizzard, comprises at least one holding apparatus which comprises a support arm and a pivot arm which is hingedly arranged on the support arm, the support arm arranged on the transport means for transporting parts of the giblet bundle, including the liver, along the second transport path, and the pivot arm is configured so as to be pivotable about a pivot axis(S), from a receiving position, about approximately 180°, into a processing position, and back, following the removal of the heart and the lungs from the giblet bundle.

19. The apparatus according to claim 18, further comprising a clamping device arranged on a free end of the pivot arm, the clamping device configured and adapted for clamping the gizzard.

20. The apparatus according to claim 2, wherein the transport means for transporting parts of the giblet bundle along the second transport path comprises a rotary plate, the rotary plate configured and adapted such that it can be synchronised, by means of a synchronisation element, with the transport conveyor of the transport means for transporting the giblet bundle held on the heart and/or on the lungs, or parts thereof, along the first transport path.

21. The apparatus according to claim 20, wherein at least two holding apparatuses for holding the giblet bundle still suspended on the heart and/or on the lungs, or the partial giblet bundle freed of the heart and lungs, and also of the gall bladder and the intestines, in the region of the gizzard, are arranged on the rotary plate.

22. Apparatus according to claim 18, wherein the means for holding the giblet bundle or the partial giblet bundle comprises a vacuum holding device as an alternative or in addition to the support and the pivot arm.

23. Apparatus according to claim 1, wherein each means for holding the giblet bundle suspended on the heart and/or on the lungs, or the partial giblet bundle, in the region of the gizzard, is associated, in each case, with a means for stripping the liver, hanging downwards, from the partial giblet bundle.

24. Apparatus according to claim 23, wherein the means for stripping the liver, hanging downwards, from the partial giblet bundle, is configured and adapted so as to be movable relative to the means for holding the giblet bundle suspended on the heart and/or on the lungs, or the partial giblet bundle, in the region of the gizzard.

25. Apparatus according to claim 23, wherein the means for stripping the liver, hanging downwards, from the partial giblet bundle, is configured and adapted so as to be movable up and down along at least one guide rod.

26. Apparatus according to claim 23, wherein the means for stripping comprises two scraper elements which are movable relative to one another, and which are made at least partially from a flexible material on their inner sides facing one another.

27. Apparatus according to claim 1, further comprising a means for removing the proventriculus and/or the spleen and/or the trachea and oesophagus from the partial giblet bundle freed of the liver arranged along the second transport path of the transport means for transporting parts of the giblet bundle.

28. The apparatus according to claim 27, further comprising means for cutting open the gizzard arranged along the second transport path of the transport means for transporting parts of the giblet bundle, in a region of the means for removing the proventriculus and/or the spleen, or downstream thereof in the transport direction.

29. The apparatus according to claim 27, further comprising:
an output station for the gizzard from the means for holding the giblet bundle, the output station configured along the second transport path of the transport means for transporting parts of the giblet bundle in the transport direction, behind the means for removing the proventriculus and/or the spleen; and
a means for removing yellow skin of the gizzard arranged in a region of the output station.

30. The apparatus according to claim 29, wherein the means for removing the yellow skin comprises a roller pair, and two skinning rollers of the roller pair configured and adapted so as to be driveable in opposite directions.

31. The apparatus according to claim 1, wherein the apparatus is connected to a controller for controlling the transport means for transporting the giblet bundle and/or the transport means for transporting parts of the giblet bundle, and controlling all the processing stations for the automatic harvesting of individual organs and/or individual components of the giblet bundle or of the partial giblet bundle.

32. A method for the automatic harvesting of edible components, in particular of a liver, a heart, lungs, and a gizzard, from a giblet bundle removed from slaughtered poultry which, in addition to the edible components, includes further giblet components, in particular a gall bladder, a spleen, a proventriculus, intestines, and a trachea and oesophagus, the method comprising the steps of:
transporting the giblet bundle, held on the heart and/or on the lungs, along a first transport path,
removing the gall bladder and the intestines from the giblet bundle,
gripping and holding the giblet bundle, suspended on the heart and/or the lungs and freed from the gall bladder and the intestines, in a region of the gizzard,
removing the heart and the lungs from the giblet bundle,
transporting the partial giblet bundle, held on the gizzard and freed from the gall bladder, the intestines, the heart and lungs, along a second transport path, and pivoting it about approximately 180°, and
stripping the liver, hanging downwards, from the partial giblet bundle.

33. The method according to claim 32, wherein, before the removal of the gall bladder and the intestines, the intestines are stretched, and the stretched intestines and the gall bladder are spatially separated from other components of the giblet bundle.

34. The method according to claim 32, wherein, prior to the removal of the gall bladder and the intestines, but preferably after the removal of the gall bladder and the intestines and prior to further processing, the giblet bundle is cooled.

35. The method according to claim 32, wherein the giblet bundle, freed from the gall bladder and the intestines, is trapped and positioned in a region of the heart and of the lungs, such that the heart and lungs are arranged at a level of a means clamping the heart and the lungs, and are pressed in the direction of outer ends of the means.

36. The method according to claim 32, wherein the heart still connected to the giblet bundle and the lungs still connected to the giblet bundle are spatially separated from the remaining components of the giblet bundle during transport along the first transport path.

37. The method according to claim 32, wherein tissue connections to the remaining components of the giblet bundle are stretched before the removal of the heart and the lungs from the giblet bundle.

38. The method according to claim 36, wherein the remaining components of the giblet bundle are brought into an inclined position, in order to be gripped and held in the region of the gizzard.

39. The method according to claim 32, wherein, following stripping of the liver from the giblet bundle, the spleen and/or the proventriculus and/or the trachea and oesophagus are removed from the still gripped and held gizzard.

40. The method according to claim 32, wherein, the still gripped and held gizzard is cut open and then released.

41. The method according to claim 40, wherein a yellow skin of the gizzard is removed from the cut-open gizzard, in that an outside edge of the cut-open, and after the gizzard is released the gizzard falls directly into a region of skinning rollers.

42. The method according to claim 32, wherein, following release, the heart removed from the giblet bundle and the lungs removed from the giblet bundle are supplied directly to a separator for separating the heart from the lungs.

43. The method according to claim 32, wherein all the steps for harvesting the individual organs or further components of the giblet bundle are automatically matched to one another in a manner controlled by means of a controller.

44. The method according to claim 32, wherein it is carried out by means of an apparatus configured and adapted for automatic harvesting of edible components of a giblet bundle removed from slaughtered poultry, the edible components comprising a liver, a heart, lungs, and a gizzard, wherein additional giblet components comprise a gall bladder, a spleen, a proventriculus, intestines, and a trachea and oesophagus, the apparatus comprising:

a transport means for transporting the giblet bundle, the transport means for transporting the giblet bundle suspended on the heart and/or on the lungs, or parts thereof, and the transport means for transporting the giblet bundle positioned along a first transport path along a plurality of processing stations, the plurality of processing stations configured for removing the gall bladder and the intestines from the giblet bundle;

a means for holding the giblet bundle in a region of the gizzard, while the giblet bundle is suspended on the heart and/or on the lungs and freed of the gall bladder and the intestines, the means for holding the giblet bundle arranged on a transport means for transporting parts of the giblet bundle, along a second transport path, a means for removing the heart and the lungs from the giblet bundle; and a means for stripping the liver, the liver hanging downwards, from the partial giblet bundle;

wherein the means for holding the giblet bundle in the region of the gizzard is configured and adapted for pivoting a partial giblet bundle, freed from the gall bladder, the intestines, the heart and lungs, about approximately 180°, such that the partial giblet bundle, together with the liver, can be transported, the liver hanging downwards, on the transport means for transporting parts of the giblet bundle.

* * * * *